(12) United States Patent
Wentker et al.

(10) Patent No.: US 8,918,637 B2
(45) Date of Patent: *Dec. 23, 2014

(54) REMOTE AUTHENTICATION SYSTEM

(71) Applicant: Visa U.S.A. Inc., San Francisco, CA (US)

(72) Inventors: David Wentker, San Francisco, CA (US); Michael Lindelsee, Redwood City, CA (US); Olivier Brand, Walnut Creek, CA (US); James Dimmick, Foster City, CA (US); Tribhuwan A. Singh Grewal, Hertfordshire (GB)

(73) Assignee: Visa U.S.A. Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/908,950

(22) Filed: Jun. 3, 2013

(65) Prior Publication Data

US 2013/0269003 A1 Oct. 10, 2013

Related U.S. Application Data

(63) Continuation of application No. 12/715,148, filed on Mar. 1, 2010, now Pat. No. 8,631,231, which is a continuation of application No. 12/104,186, filed on Apr. 16, 2008, now Pat. No. 8,156,543.

(60) Provisional application No. 60/912,406, filed on Apr. 17, 2007.

(51) Int. Cl.
| | |
|---|---|
| *H04L 29/06* | (2006.01) |
| *G06F 21/33* | (2013.01) |
| *G06Q 30/06* | (2012.01) |
| *G06Q 20/40* | (2012.01) |
| *G06Q 20/38* | (2012.01) |

(52) U.S. Cl.
CPC ........ *H04L 63/08* (2013.01); *G06F 2221/2115* (2013.01); *G06F 21/33* (2013.01); *G06Q 30/06* (2013.01); *G06F 2221/2103* (2013.01); *G06Q 20/40* (2013.01); *G06Q 20/385* (2013.01)
USPC .......... 713/155; 713/168; 713/169; 713/170; 713/174; 726/27; 726/28; 726/29; 726/30

(58) Field of Classification Search
CPC ............................... H04L 63/08; G06F 21/33
USPC ....................................................... 713/155
See application file for complete search history.

(56) References Cited

U.S. PATENT DOCUMENTS

| | | |
|---|---|---|
| 4,341,951 A | 7/1982 | Benton |
| 4,755,872 A | 7/1988 | Bestler et al. |

(Continued)

FOREIGN PATENT DOCUMENTS

| | | |
|---|---|---|
| JP | 2002-183612 A | 6/2002 |
| JP | 2002-334291 A | 11/2002 |

(Continued)

OTHER PUBLICATIONS

White, Ron; "How Computers Work"; 1999, Millennium Ed., Que Corporation, Indianapolis, In.

(Continued)

*Primary Examiner* — Longbit Chai
(74) *Attorney, Agent, or Firm* — Kilpatrick Townsend & Stockton LLP

(57) ABSTRACT

One embodiment of the invention is directed to a method including receiving an alias identifier associated with an account associated with a presenter, determining an associated trusted party using the alias identifier, sending a verification request message to the trusted party after determining the associated trusted party, and receiving a verification response message.

16 Claims, 13 Drawing Sheets

(56) References Cited

U.S. PATENT DOCUMENTS

| | | | |
|---|---|---|---|
| 5,008,930 A | 4/1991 | Gawrys et al. | |
| 5,023,904 A | 6/1991 | Kaplan et al. | |
| 5,383,113 A | 1/1995 | Kight et al. | |
| 5,485,510 A | 1/1996 | Colbert | |
| 5,591,949 A | 1/1997 | Bernstein | |
| 5,729,460 A | 3/1998 | Plett et al. | |
| 5,778,313 A | 7/1998 | Fougnies | |
| 5,787,159 A | 7/1998 | Hamilton et al. | |
| 5,815,657 A | 9/1998 | Williams et al. | |
| 5,937,396 A | 8/1999 | Konya | |
| 5,945,652 A | 8/1999 | Ohki et al. | |
| 5,991,748 A | 11/1999 | Taskett | |
| 5,991,749 A | 11/1999 | Morrill, Jr. | |
| RE36,788 E | 7/2000 | Mansvelt et al. | |
| 6,105,008 A | 8/2000 | Davis et al. | |
| 6,169,974 B1 | 1/2001 | Baumgartner et al. | |
| 6,282,522 B1 | 8/2001 | Davis et al. | |
| 6,295,522 B1 | 9/2001 | Boesch | |
| 6,298,336 B1 | 10/2001 | Davis et al. | |
| 6,418,420 B1 | 7/2002 | DiGiorgio et al. | |
| 6,439,456 B1 | 8/2002 | Bansal et al. | |
| 6,612,487 B2 | 9/2003 | Tidball et al. | |
| 6,675,153 B1 | 1/2004 | Cook et al. | |
| 6,769,605 B1 | 8/2004 | Magness | |
| 6,868,391 B1 | 3/2005 | Hultgren | |
| 7,003,493 B2 | 2/2006 | Weichert et al. | |
| 7,007,840 B2 | 3/2006 | Davis | |
| 7,047,041 B2 | 5/2006 | Vänskä et al. | |
| 7,107,078 B2 | 9/2006 | Lehto | |
| 7,111,789 B2 | 9/2006 | Rajasekaran et al. | |
| 7,155,411 B1 | 12/2006 | Blinn et al. | |
| 7,165,037 B2 | 1/2007 | Lazarus et al. | |
| 7,203,315 B1 | 4/2007 | Livesay | |
| RE39,736 E | 7/2007 | Morrill, Jr. | |
| 7,237,721 B2 | 7/2007 | Bilcu et al. | |
| 7,264,152 B2 | 9/2007 | Tsuei et al. | |
| 7,349,871 B2 | 3/2008 | Labrou et al. | |
| 7,415,442 B1 | 8/2008 | Battaglini et al. | |
| 7,454,232 B2 | 11/2008 | Abuhamdeh | |
| 7,653,602 B2 | 1/2010 | Davis | |
| 7,707,120 B2 | 4/2010 | Dominguez et al. | |
| 7,827,115 B2 | 11/2010 | Weller et al. | |
| 7,908,216 B1 | 3/2011 | Davis et al. | |
| 7,991,701 B2 | 8/2011 | Weller et al. | |
| 8,019,691 B2 | 9/2011 | Dominguez et al. | |
| 8,332,323 B2 | 12/2012 | Stals et al. | |
| 8,346,210 B2 | 1/2013 | Balsan et al. | |
| 8,380,177 B2 | 2/2013 | Laracey | |
| 8,412,631 B2 | 4/2013 | Crofts | |
| 2002/0128967 A1 | 9/2002 | Meyer et al. | |
| 2002/0152168 A1 | 10/2002 | Neofytides et al. | |
| 2002/0174016 A1 | 11/2002 | Cuervo | |
| 2003/0061162 A1 | 3/2003 | Matthews | |
| 2003/0061167 A1 | 3/2003 | Mann | |
| 2003/0105710 A1 | 6/2003 | Barbara et al. | |
| 2003/0126094 A1 | 7/2003 | Fisher et al. | |
| 2003/0130940 A1 | 7/2003 | Hansen et al. | |
| 2004/0030659 A1 | 2/2004 | Gueh | |
| 2004/0039693 A1 | 2/2004 | Nauman et al. | |
| 2004/0049455 A1 | 3/2004 | Mohsenzadeh | |
| 2004/0083184 A1 | 4/2004 | Tsuei et al. | |
| 2004/0122685 A1 | 6/2004 | Bunce | |
| 2004/0188515 A1 | 9/2004 | Jimenez | |
| 2004/0267665 A1* | 12/2004 | Nam et al. | 705/41 |
| 2005/0044423 A1 | 2/2005 | Mellmer et al. | |
| 2005/0080697 A1 | 4/2005 | Foss, Jr. et al. | |
| 2005/0131816 A1 | 6/2005 | Britto et al. | |
| 2005/0209958 A1 | 9/2005 | Michelsen et al. | |
| 2005/0246293 A1 | 11/2005 | Ong | |
| 2006/0006224 A1 | 1/2006 | Modi | |
| 2006/0189382 A1 | 8/2006 | Muir et al. | |
| 2006/0259439 A1 | 11/2006 | Mann et al. | |
| 2007/0027820 A1 | 2/2007 | Elharar et al. | |
| 2007/0045401 A1 | 3/2007 | Sturm | |
| 2007/0053513 A1 | 3/2007 | Hoffberg | |
| 2007/0057043 A1 | 3/2007 | de la Garza Ortega et al. | |
| 2007/0094132 A1 | 4/2007 | Waterson et al. | |
| 2007/0094150 A1* | 4/2007 | Yuen et al. | 705/64 |
| 2008/0033877 A1 | 2/2008 | Blair et al. | |
| 2008/0040274 A1 | 2/2008 | Uzo | |
| 2008/0103972 A1 | 5/2008 | Lanc | |
| 2008/0120231 A1 | 5/2008 | Megwa | |
| 2008/0140548 A1 | 6/2008 | Csoka | |
| 2009/0037982 A1 | 2/2009 | Wentker et al. | |
| 2009/0325542 A1 | 12/2009 | Wentker et al. | |
| 2010/0094753 A1 | 4/2010 | Carlson et al. | |
| 2010/0153272 A1 | 6/2010 | Wentker et al. | |
| 2010/0198728 A1 | 8/2010 | Aabye et al. | |
| 2010/0318783 A1 | 12/2010 | Raj et al. | |
| 2011/0016051 A1 | 1/2011 | Trifiletti et al. | |
| 2011/0035319 A1 | 2/2011 | Brand et al. | |
| 2011/0055077 A1 | 3/2011 | French | |
| 2011/0178925 A1 | 7/2011 | Lindelsee et al. | |
| 2011/0178926 A1 | 7/2011 | Lindelsee et al. | |
| 2011/0178927 A1 | 7/2011 | Lindelsee et al. | |
| 2012/0037697 A1 | 2/2012 | Boone et al. | |
| 2012/0252405 A1 | 10/2012 | Lortz | |
| 2013/0159195 A1 | 6/2013 | Kirillin | |
| 2013/0226812 A1 | 8/2013 | Landrok | |
| 2013/0275307 A1 | 10/2013 | Khan | |

FOREIGN PATENT DOCUMENTS

| | | | |
|---|---|---|---|
| JP | 2003-099687 A | 4/2003 | |
| KR | 20030019404 A | 3/2003 | |
| KR | 10-0506913 B1 | 8/2005 | |
| KR | 20070007044 A | 1/2007 | |
| WO | 96/13814 A1 | 5/1996 | |
| WO | 01/13275 A1 | 2/2001 | |
| WO | 01/35355 A1 | 5/2001 | |
| WO | 01/97118 A1 | 12/2001 | |
| WO | 2004/008288 A2 | 1/2004 | |

OTHER PUBLICATIONS

Supplementary European Search Report mailed Oct. 24, 2012 in EP Application No. 08746005.1, 5 pages.

Japanese Office Action mailed Jan. 18, 2013 in related Japanese Patent Application No. 2010-504222, 3 pages.

English Translation of Office Action mailed Oct. 15, 2014 in Korean Patent Application No. KR 2009-7023807, 5 pages.

* cited by examiner

REMOTE AUTHENTICATION SYSTEM

CROSS-REFERENCES TO RELATED APPLICATIONS

This application is a continuation application of U.S. patent application Ser. No. 12/715,148, filed on Mar. 1, 2010, which is a continuation application of U.S. patent application Ser. No. 12/104,186, filed on Apr. 16, 2008, which is a non-provisional of and claims the benefit of U.S. Provisional Patent Application No. 60/912,406, filed on Apr. 17, 2007, which are all herein incorporated by reference in their entirety for all purposes.

BACKGROUND

During a transaction (a payment or non-payment transaction) between two parties, each party typically wants to authenticate the identity and/or the data relating to the other party to avoid fraud.

Transactions initiated and conducted from a remote communication device can be riskier than face-to-face transactions, because conventional face-to-face authentication procedures cannot be performed. For example, it is not possible to check a picture on a consumer's driver's license when conducting a remote transaction.

In view of the foregoing, a system for authenticating the identity and profile data of an individual such as a consumer during a remote transaction would be desirable. The authenticating system would desirably be easy to implement and use, would require a minimal investment of resources, and would provide a high level of interoperability between the system's participants.

Another problem that is associated with transactions generally is that merchants often receive payment card information during purchase transactions. If a merchant is not honest, a consumer's payment information could be compromised. Other embodiments of the invention are directed to the use of alias identifiers to initiate transactions such as payment transactions so that merchants do not retain consumer payment information.

Embodiments of the invention solve the above problems and other problems individually and collectively.

BRIEF SUMMARY

Embodiments of the invention include methods and systems for authenticating the identity of an individual and validating the profile data of the individual ("a presenter") who presents himself or herself to another party ("an acceptor") as having a certain identity and having certain corresponding profile data. Although embodiments of the invention are not limited to remote transactions, embodiments of the invention can be advantageously used in remote transactions where a face-to-face authentication procedure is difficult to perform. Embodiments of the invention also allow a trusted party to authenticate a presenter's identity and profile data. Other capabilities such as profile data provisioning and profile updating can also be performed.

One embodiment is directed to a method comprising: a) receiving an alias identifier (e.g., a telephone number), wherein the alias identifier is associated with an account identifier (e.g., a payment card account number) for an account of a presenter (e.g., a consumer who possess the payment card); b) determining an associated trusted party (e.g., a bank that issued the payment card) using the alias identifier; c) sending a verification request message to the trusted party after determining the associated trusted party, where the verification request message requests information regarding whether the trusted party or the presenter participates in an authentication program; and d) receiving a verification response message, wherein the verification response message indicates whether the trusted party or the presenter participates in the authentication program.

Another embodiment of the invention is directed to a computer readable medium comprising: a) code for receiving an alias identifier, wherein the alias identifier is associated with an account identifier for an account of a presenter; b) code for determining an associated trusted party using the alias identifier; c) code for sending a verification request message to the trusted party after determining the associated trusted party, where the verification request message requests information regarding whether the trusted party or the presenter participates in an authentication program; and d) code for receiving a verification response message, wherein the verification response message indicates whether the trusted party or the presenter participates in the authentication program.

Another embodiment of the invention is directed to a method comprising: a) providing an alias identifier associated with an account identifier associated with an account of a presenter; b) receiving an authentication request message after providing the alias identifier; and c) sending an authentication response message after receiving the authentication request message.

Another embodiment of the invention is directed to a computer readable medium comprising: a) code for providing an alias identifier associated with an account identifier associated with an account of a presenter; b) code for receiving an authentication request message after providing the alias identifier; and c) code for sending an authentication response message after receiving the authentication request message.

These and other embodiments of the invention are described in further detail below with reference to the Figures and Detailed Description.

DETAILED DESCRIPTION

Figure 1:
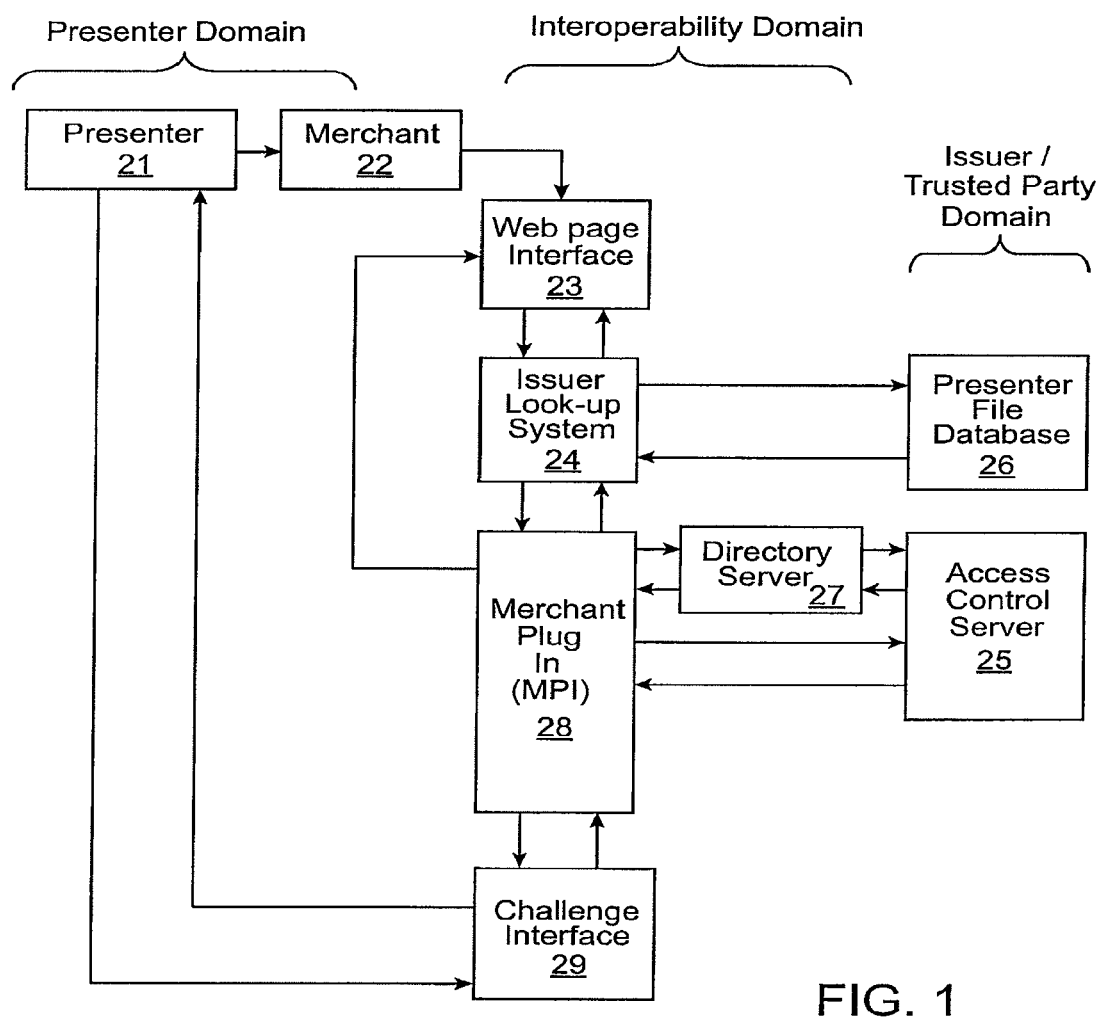
FIG. 1 shows a block diagram of a system according to one embodiment of the invention.

Embodiments of the present invention provide for methods and systems for authenticating the identity and validating the profile data of an individual ("a presenter") who presents himself or herself to another party ("an acceptor") as having a certain identity and having certain corresponding profile data. A consumer may be an example of a presenter. The acceptor can be a service provider, a government agency, a merchant, or any other entity that my need to authenticate the identity of the presenter before proceeding with a transaction. Authentication of identity can refer to verifying the identity of a presenting party who purports to be a certain individual. Validating profile data can refer to validating that profile data provided by a presenter is actually associated with the presenter. Other capabilities such as profile data provisioning and profile updating can also be performed in embodiments of the invention. These functions can be performed individually or in any combination with each other. Embodiments of the invention can be advantageously used to conduct remote transactions where traditional face-to-face authentication procedures are difficult to perform.

Illustratively, in one embodiment of the invention, a consumer who is calling a merchant to make a purchase using a credit card may be authenticated before the transaction proceeds. An issuer of the credit card may authenticate the consumer and the consumer's profile data before the transaction is concluded. (An issuer can be a bank, credit union, or other institution that can open an account on behalf of a consumer so that the consumer can conduct transactions using the account.) After the consumer and the consumer's data are authenticated, this information may be subsequently sent to the merchant. The merchant may then proceed with the transaction knowing that the issuer has authenticated the consumer and the consumer's data. In some instances, if the issuer of the credit card authenticates the consumer and the consumer's data, the issuer may bear the risk if the transaction is later determined to be fraudulent. Hence, using embodiments of the invention, merchants and issuers can have greater confidence that the transactions being conducted are authentic.

Many specific embodiments of the invention are described in detail below. The following acronyms are used in some instances:

ACS: Access Control Server—An access control server can provide issuers with the ability to authenticate presenters (e.g., consumers, cardholders) during a transaction such as a remote or face-to-face purchase transaction.

DS: Directory Server—A directory server can be used to route messages containing enrolment and authentication information between a merchant plug-in (MPI) and issuers ACS'.

IVR: Interactive Voice Response unit—An interactive voice response unit can include phone technology that allows a computer apparatus to detect voice and touch tones via a normal phone call.

SMS: Short Message Service—A short message service can include messages that are sent to and from mobile phones. Typical SMS messages can allow users to send up to 160 characters per message MPI: Merchant Plug-In—A merchant plug-in can be a component that operates in an acquirer domain in some embodiments. In the online environment, it performs various authentication functions on behalf of the merchant. Such functions include determining whether authentication is available for a card number, and validating a digital signature in an authentication message. The merchant plug-in may be embodied by suitable hardware and/or software that are accessible to a merchant.

MSISDN: Mobile Subscriber ISDN Number—A mobile subscriber ISDN (integrated services digital network) number can be a consumer's telephone number.

USSD: Unstructured Supplementary Service Data—Unstructured supplementary service data has a capability built into the GSM (global system for mobile communications) standard for support of the transmission of information over the channels of the GSM network. USSD provides session-based communication capability, thereby enabling a variety of applications.

WAP: Wireless Application Protocol—WAP browsers can provide all of the basic services of a PC (personal computer) based web browser, and can be simplified to operate within the restrictions of a mobile phone.

As noted above, embodiments of the invention are especially useful for conducting remote transactions. Remote transactions can be conducted through communications methods including, but not limited to, mobile or land-line voice calls, Short Message Service (SMS) messages, etc. Various data transfer protocols (e.g.: TCP/IP) may also be used. Remote transactions can be initiated from devices including, but not limited to, mobile phones, smartphones, Internet-connected computers or terminals, personal digital assistants (PDAs), etc.

Embodiments of the invention are not limited to the use of mobile phones and remote transactions. Embodiments of the invention may also include the use of various communication devices, payment channels, and authentication channels. Some examples of communication devices, payment channels, and authentication channels are provided below.

| Browsing channel/ environment/device | Payment channel or mechanism | Consumer authentication channel |
|---|---|---|
| A consumer browsing a merchant's Web site using a personal computer such as a desktop or laptop computer. E.g., a consumer purchases a portable music device on the Internet. | The consumer enters his or her phone number on a Web page on a merchant's Web site using his or her personal computer. | The consumer can be authenticated using an inbound IVR call, via a client application running on a mobile or stationary device operated by the consumer, or via any other suitable channel/process implemented by the consumer's issuer or other entity. |
| Mail order/telephone order (MOTO). E.g., a consumer purchases a pizza by calling a restaurant. | The merchant's call centre agent obtains the consumer's phone number and enters it into a Web page on the merchant's Web site. | As above. |
| IVR, or another automated channel such as USSD or SMS. E.g., a consumer purchases airtime using a phone. | The consumer calls an automated service (e.g., via IVR), chooses the payment amount, and enters his or her mobile phone number. | As above. |

| Browsing channel/ environment/device | Payment channel or mechanism | Consumer authentication channel |
|---|---|---|
| Face-to-face (a merchant enters payment details into a point of sale (POS) terminal such as a phone). E.g., a consumer pays a plumber for services rendered in a face-to-face transaction. | The merchant initiates the transaction from the merchant's mobile phone. For example, the merchant may separately enter the consumer's CVV-2 number on the back of the consumer's payment card for card present status. | As above. |
| Face-to-face (a consumer enters payment details into a mobile phone or the like). E.g., a consumer paying a plumber for service rendered in a face-to-face transaction. | The consumer initiates the transaction from his or her mobile phone The consumer finishes by entering the merchant's phone number and payment amount into the consumer's mobile phone. | As above. |

Specific embodiments of the invention can now be described with reference to the Figures. In one embodiment, an alias identifier is received. The alias identifier is associated with an account identifier such (as an account number) for an account of the presenter (e.g., a consumer). The alias identifier can be a phone number and the account identifier can be an account number such as a credit card account number. After the alias identifier is received, an associated trusted party is determined using the alias identifier. The trusted party may be an issuer that issued the credit card account number to the presenter.

A verification request message can then be sent to the trusted party after determining the associated trusted party. The verification request message requests verification that the trusted party or the presenter participates in an authentication program. For example, it may request verification that one or both of the presenter and the trusted party participate in the authentication program. After the verification request message is sent, a verification response message is received. The verification response message indicates whether the trusted party or the presenter participates in the authentication program.

After receiving the verification response message, an authentication request message may be sent to a communication device (e.g., a phone) operated by the consumer. The consumer may then initiate the sending of an authentication response message which authenticates the consumer. After the consumer is authenticated, the consumer may proceed with the intended transaction. The transaction may be a purchase transaction, a money transfer, etc.

FIG. 1 shows a system according to one embodiment of the invention. The system in FIG. 1 can be used to conduct remote transactions, such as those that occur over the Internet or using a telephone (e.g., a mobile phone).

The components of the system can be characterized as being within a presenter domain, an interoperability domain, and a trusted party domain. In other embodiments of the invention, the components in the system may be present in other types of domains or different domains. A system according to an embodiment of the invention may include any number or combination of components in a single domain or any suitable combination of domains. In the embodiment in FIG. 1, an authentication system may include the components shown in the interoperability domain and the issuer/trusted party domain.

FIG. 1 shows a presenter 21 in communication with a merchant 22. The merchant 22 may provide a Web page interface 23, which may be coupled to an issuer look-up system 24. The issuer look-up system 24 may be operatively coupled to a merchant plug-in (MPI) 28, a directory server 27, and access control server 25, a presenter file database 26, as well as a challenge interface 29.

In FIG. 1, the presenter domain includes the presenter 21 and the merchant 22. The presenter 21 can be a user, individual, or consumer whose identity is being authenticated and/or whose data are being validated or provisioned. The merchant 22 is an example of an acceptor and can be a party with whom the presenter 21 is attempting to transact. The presenter 21 can access the authentication system via the merchant 22 or directly using a communication device such as a mobile phone or a computer apparatus.

The data authentication system can run an authentication program, and can include a trusted party or components operated by a trusted party. The trusted party can be the entity that authenticates the presenter's identity and validates, provisions, or updates data relating to the presenter 21. In some embodiments, the trusted party can be a bank, a credit or debit card issuing bank, or a credit or debit card service organization (e.g., Visa). Illustratively, the bank can be the issuing bank of a credit card that is used by this presenter. The presenter 21 can be a customer of the bank. The trusted party can have an established relationship with the presenter 21 and therefore can have the presenter's profile data, which can be used to authenticate the presenter 21. The presenter profile data may include the presenter's social security number, birthday, account number, shipping address, preferences, etc.

The trusted party may own or operate an access control server 25 (ACS), which can be a computer apparatus which, among other things, controls access to the authentication program, performs the requested data services, and provides digitally signed notifications to acceptors regarding the authentication services. Multiple trusted parties may share an ACS or it may be associated with a single trusted party. Alternatively, a trusted party may have multiple access control servers, each associated with a subset of the presenters.

As used herein, a "server" is typically a powerful computer or cluster of computers. For example, a server may be a large mainframe, a minicomputer cluster, or a group of servers functioning as a unit. In one example, a server may be a database server coupled to a Web server. Moreover, a server can behave as a single computer, which services the requests of one or more client computers or portable electronic devices.

The presenter file database 26 can be a database that is managed by or associated with the trusted party. It can store information relating to presenters that are successfully enrolled in the authentication program. Such information includes identifiers such as program identity numbers and account numbers, profile data, and passwords.

The interoperability domain also includes a directory server 27. The interoperability domain may include components used by both the trusted party and the acceptor in some embodiments. The directory server 27 can determine whether a presenter can utilize the data authentication services. In some cases, the directory server 27 can be operated by a service organization such as Visa.

The respective relationship between the presenter, trusted party, and acceptor within the data authentication services system allows a wide range of possible services to be provided. Examples of such services include: identity authentication, profile validation, profile data provisioning, and profile data updating. One implementation of profile validation operates to validate the address of a presenter and one implementation of profile data updating operates to update the account information of a presenter.

The authentication system can be used in non-payment and in payment related transactions between the presenter 21 and the merchant 22. In payment related transactions, additional operations such as authorization of debits and credits from financial accounts may also be performed. Additional systems such as issuer authorization and settlement systems may also be used.

A presenter enrollment process can now be described. In one embodiment, the presenter 21 registers with a trusted party to participate in the authentication program. Upon successful registration, the trusted party can provide or assign the presenter 21 with a program identity number (or other alias identifier) and an authenticating password, token, or other authenticating element. An authenticating password, token, or other authenticating element allows trusted party to authenticate the identity of the presenter 21 since only trusted party and presenter 21 know the password, token, or other authenticating element. The alias identifier and/or authentication element may be related to a communication device (e.g., a phone) in some way. For example, the alias identifier may be a phone number and the authentication element may be a SIM card number for the phone.

A program identity number is a number that identifies presenters who are properly enrolled to use the authentication program. The program identity number or alias identifiers generally, may be linked to an account identifier such as an account number associated with the presenter 21.

A program identity number can include any suitable type of number. An exemplary program identify number may include a random number or a number issued out of a series of numbers. In one embodiment, a program identity number can be a phone number. This is convenient in the case where the presenter 21 is interacting with the authentication system by voice or a Short Message Service (SMS) message using a telephone with that phone number. The program identity number may be used in place of the presenter's account number when conducting a transaction.

In embodiments of the invention, the identity number can generally correspond to a communications device or communications service address or identifier (e.g., a phone number, an e-mail address, etc.). If a telephone number is used as an identity number, the system may use a service such as automatic number identification (ANI) service to automatically determine the presenter's phone number. Alternatively, the presenter 21 may be asked to provide his phone number using his voice or by manually inputting the phone number into his phone.

In embodiments of the invention, the identity number may include additional information, such as at least part of an account identifier (e.g., an account number) or acceptor identification number. For example, if the transaction that is being conducted involves a credit card, the additional information could be the credit card issuer's Bank Identification Number (BIN), which corresponds to the first six digits of the card account number. This additional identifying information is useful when multiple accounts or acceptors might be associated with a given presenter identity number.

During the enrollment process, the presenter 21 can present the trusted party with enrollment data, authentication data, and profile data. These types of data can be used to verify the presenter's identity so that the trusted party can authenticate the presenter 21 and determine if the presenter is participating in the authentication program. Authentication data can be used to authenticate the presenter during a subsequent transaction. Examples of authentication data can include passwords, unique data in chip cards, biometric data, etc. It should be understood that various types of authentication data can be used. If such data is not already on file with the trusted party, profile data can be used to validate and/or provision profile data during a subsequent transaction.

The presenter enrollment process can occur in a variety of ways. For instance, the enrollment process can take place online, in a person-to-person interaction, a telephone conversation, or through the mail. In an exemplary online enrollment process, a presenter can visit an enrollment Web site to provide suitable information to obtain a program identity number (or other alias identifier) and an authenticating element. In some embodiments, enrollment can also be automatically initiated the first time an un-enrolled presenter attempts to perform a transaction.

A data authentication process associated with a data authentication program can now be described with respect to FIG. 1. The data authentication program can be used in a variety of situations where an acceptor such as the merchant 22 wants to authenticate a presenter 21. For instance, in a non-payment example, the presenter 21 can visit a government Web site (which is an example of an acceptor Web site) in order to fill out an application for a small business license. Various government agencies offer online services through their Web sites. Typically, a government agency wants to confirm information (e.g., a name, address, etc.) entered by the presenter 21. Embodiments of the invention can also operate in a similar manner for a payment example. For instance, the following example describes operation of the data authentication program where a customer calls a merchant 22 and places an order, and then plans to pay for the order with his credit card.

The presenter 21 initiates the transaction by calling the merchant 22 to place an order for a good or service. In other embodiments, the presenter 21 can interact with the merchant 22 using an SMS message, through Internet using a Web browser or e-mail, etc. Additionally, the customer and the merchant could interact face-to-face.

After placing the order, the presenter 21 provides an identity number, such as a cellular phone number, possibly augmented with additional identification information such as a BIN (bank identification number) and/or an additional identifier, to the merchant 22. This information can be provided to the merchant 22, instead of the presenter's 21 account number. The identity number, or portions of the identity number, such as a cellular phone number, can also be automatically determined using systems such as ANI (automatic number identification) rather than being manually provided by the presenter 21.

After receiving the identity number, the merchant 22 enters it into the data authentication system (assuming the presenter 21 does not provide it directly to the authentication system). The merchant 22 may interface with the authentication system through the use of a Web page interface 23 or through some other means. For instance, the merchant 22 may enter the identity number into the Web page interface 23. In other embodiments the presenter 21 could enter the identity number directly into the system via the Web page interface 23 or through some other interface.

After the identity number is received by the Web page interface 23, the issuer look-up system 24 receives the identity number and determines the issuer that is associated with the identity number. Once the relevant issuer is determined, the issuer look-up system 24 electronically sends the identity number to the issuer. The issuer maintains a presenter file database 26 which is used to convert the identity number to an account number. The account number and the identity number are then forwarded to the merchant plug-in (MPI) 28 by the issuer look-up system 24.

Next, the merchant plug-in (MPI) 28 checks to see if the presenter 21 is participating in the data authentication program. In one implementation, a two-phase process is used to check to see if the presenter 21 participates in the authentication program. In the two-phase process, the directory server 27 (DS) and the access control server (ACS) 25 are queried. The directory server 27 receives the identity number and determines if the issuer associated with the identity number is participating in the data authentication program. The presenter 21 can use the data authentication program if the issuer is willing to authenticate the identity of the presenter 21 and to provide data services relating to the presenter. After receiving the identity number, the access control server (ACS) 25 determines if the presenter 21 is enrolled with the authentication program and if the device type (for example, a cellular phone) associated with the identity number is supported by the authentication system.

If the issuer does not participate in the data authentication program, or if the presenter 21 is not enrolled in the data authentication program, the merchant 22 can decide to either terminate the transaction or to proceed in some other manner. If the issuer participates in the authentication program, but the presenter 21 is not enrolled, then the presenter 21 may be presented with an opportunity to enroll in the data authentication program.

If the issuer and the presenter 21 are participating in the data authentication program, and if the device associated with the identity number is capable of being used in program, then the access control server (ACS) 25 generates a remote authentication request message, which is sent to the merchant plug-in (MPI) 28 (e.g., if the MPI is hosted by an acquirer or other trusted party).

The merchant (MPI) 28 then issues an authentication challenge to the presenter 21 via the challenge interface 29. In order to do this, it associates the presenter's payment card number with the identity number. If the identity number corresponds to a cellular phone, the phone number is extracted from the identity number and used to send an authentication challenge to the presenter's phone. An Unstructured Supplementary Service Data (USSD) protocol may be used to send an authentication challenge to the customer's cellular phone using a challenge interface module 29. Those skilled in the art will recognize that other protocols or communication methods may be used. For example, the authentication challenge might be an SMS message, an automated pre-recorded phone call, or an interactive chat message.

The presenter 21, upon receiving the authentication challenge, responds with the predetermined authentication data. For example, if the authentication challenge is issued via an SMS message, the presenter 21 may send a response SMS message including a password. If the authentication challenge is by phone call, the presenter 21 may use a phone keypad or may use his voice to provide the password. Other types of authentication data, such as biometric data, chip card data, etc. could alternatively be used.

Once the merchant plug-in (MPI) 28 receives the presenter's authentication data, transaction data (e.g., card data including a card account number and expiration data) are attached and sent to the issuer's access control server (ACS) 25. The issuer's access control server (ACS) 25 validates the authentication data and reports the result of the validation to the merchant plug-in (MPI) 28. The merchant plug-in (MPI) 28 then informs the merchant 22 of the result of the verification, for example, through the Web page interface 23. If the verification was successful, the merchant 22 can be provided with the presenter's account identifier (e.g., account number) or a portion thereof. The issuer can then be informed of the transaction details and the transaction may proceed to completion.

After the transaction is completed, messages may be sent to the presenter's device (e.g., a phone) corresponding to the identity number and the merchant 22, using the Web interface 23. For example, a message may be sent to the presenter's phone using the presenter's phone number, indicating that the presenter 21 was properly authenticated and that the transaction was successfully completed. It should be understood that all messages described in FIG. 1 can be encrypted to increase the level of security.

Embodiments of the invention can also be implemented such that the presenter 21 and the merchant 22 are transacting in person. The merchant 22 can interact with the system by providing an identity number associated with the merchant 22, rather than the presenter 21. The merchant 22 could also provide the identity number of the presenter 21 to the system. The presenter 21 can receive an authentication challenge on his own device and could respond with authentication data as described above. In another embodiment the presenter 21 could interact with the system by providing the merchant's identity number and the payment amount for the transaction.

Note that in embodiments of the invention, the presenter 21 could have a number of payment cards (e.g., more than two credit cards). In one embodiment, if the presenter 21 is using a communication device such as a wireless phone, the presenter 21 could be presented with a list of primary account numbers to select from. The presenter's current phone number may correspond to a default primary account number so that when the presenter 21 conducts a transaction with the phone number, the default primary account number is eventually used to conduct the transaction. In another embodiment, the list of primary account numbers may be presented to the presenter 21 and the presenter 21 chooses the account number to be used in the transaction, prior to conducting a transaction. In this case, there may be no default account number associated with the phone number. In yet another embodiment, there can be a different alias identifier associated with each primary account number in the list. For example, the alias identifiers may simply be "card1", "card2", and "card3", for three different primary account numbers.

Figure 2:
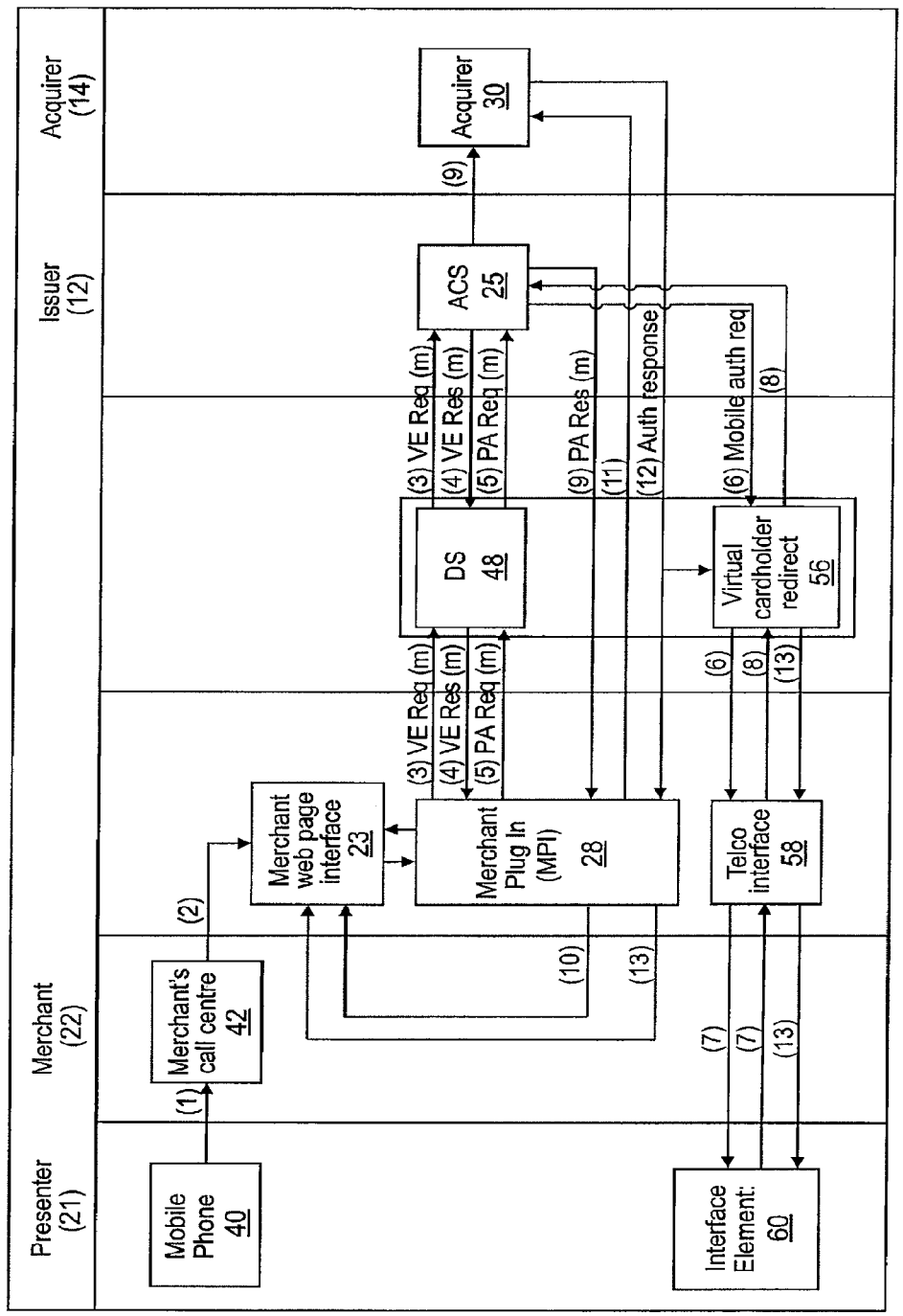
FIG. 2 shows another block diagram of a system according to another embodiment of the invention.

FIG. 2 shows a block diagram of another system according to another embodiment of the invention. Message flows are also shown. Some of the components in FIG. 2 are similar to some of the components in FIG. 1. FIG. 2 additionally shows a mobile phone 40 in communication with a merchant's call center 42, as well as an interface element 60 that is coupled to a Telco (telephone company) 58 interface, which is in turn coupled to a virtual cardholder redirect module 56. An issuer 12 and acquirer 14 are also specifically shown in FIG. 2.

In this embodiment, a presenter 21 initiates a purchase transaction with a merchant 22 using a credit card (or some other payment device). Although a credit card transaction is described in detail, the transaction could alternatively be conducted with a stored value card, a debit card, a contactless phone, a smart card, etc.

The presenter 21 uses his mobile phone 40 to call the merchant's call center 42 (step 1). The presenter 21 then provides (e.g., by voice, entering a phone number into phone 40, etc.) an alias identifier such as an identity number, which may include some or all of the phone number associated with the mobile phone 40. Additional identifier information may include the BIN (bank identification number) associated with a credit card number of the credit card held by the presenter 21, etc. Another type of alias identifier may be a nickname or other alias assigned by the presenter 21 to the particular credit card being used. The merchant 22 can then enter one or more of the alias identifiers into the merchant Web page interface 23 (step 2).

The merchant plug-in (MPI) 28 receives the alias identifier, and it is sent to the directory server (DS) 48 in a verification request message (VE Req(m)) (step 3). After receiving the verification request message, the directory server 48 queries the access control server 25 (step 3) in order to determine whether authentication is available for the presenter 21. In this example, the verification request message (VE Req(m)) includes an alias identifier such as the phone number of the mobile phone 40.

The access control server (ACS) 25 responds by sending a verification response (VE Res (m)) message (step 4) to the merchant plug-in (MPI) 28 by passing the message through the directory server 48. After receiving the verification response message, the merchant plug-in (MPI) 28 sends a payment authentication request message (PA Req (m)) to the access control server (ACS) 25 through the directory server (DS) 48 (step 5). The access control server (ACS) 25 then generates a mobile authentication request message (step 6), which is passed to a telephone company (Telco) interface 58 via a virtual cardholder redirect module 56. In order to do so, the directory server (DS) 48 re-associates the presenter's credit card number with his phone number, and contacts an interface element 60 that is accessible to the presenter 21 via the Telco interface 58 (steps 6 and 7). The interface element 60 could include a user interface on the mobile phone 40, or it could include a user interface on a device other than the mobile phone 40.

The authentication request message is then sent to the presenter 21 prompting the presenter 21 to respond with a pre-determined password or other authentication data (step 7). In step 8, the card number associated with the credit card being used is reattached to the authentication data and the supplemented response message is sent to the issuer's access control server (ACS) 25 via the Telco interface 58. In step 9, after receiving the authentication response message including the password from the presenter 21, the issuer 12 validates the password. After the issuer 12 validates the password, it sends the payment authentication response (PA Res(m)) message to the merchant plug-in (MPI) 28 (step 9).

Note that in some embodiments, the payer authentication response (PA Res(m)) message may include additional information (e.g., shipping address, contact information such as e-mail address, preferences, etc.) about the presenter 21. For example, the shipping address of the presenter 21 may be sent from the issuer's ACS 25 to the merchant plug-in (MPI) 28. In such embodiments, the merchant 22 advantageously need not retain such additional information. Thus, any suitable information that was previously collected by the issuer 12 may be sent to the merchant 22 after a transaction is initiated by the presenter 21.

In step 10, an employee of the merchant 22 is informed of the result of the authentication process using the Web page interface 23. In step 11, a response message 11 is sent to the merchant's acquirer 14 from the merchant plug-in (MPI) 28. The acquirer 30 completes the transaction by sending messages (step 12) to both the presenter 21 via the Telco interface 58 and the merchant 22 via the web interface 23.

In an alternate embodiment, a presenter 21 can interact with a merchant's website via the Web page interface 23 without going through the merchant's call centre 42. The presenter 21 can enter his identity number into a "payment page" and would subsequently receive an authentication challenge on the interface element 60.

The process flow shown in FIG. 2 has a number of advantages. For example, in FIG. 2, the presenter 21 is properly authenticated in a quick and efficient manner, even though the merchant 22 never sees or possesses the actual account number of the credit card that the presenter 21 is using. This provides additional security for the presenter 21, since some merchants or employees of merchants could fraudulently use payment account numbers of presenters.

Figure 3:
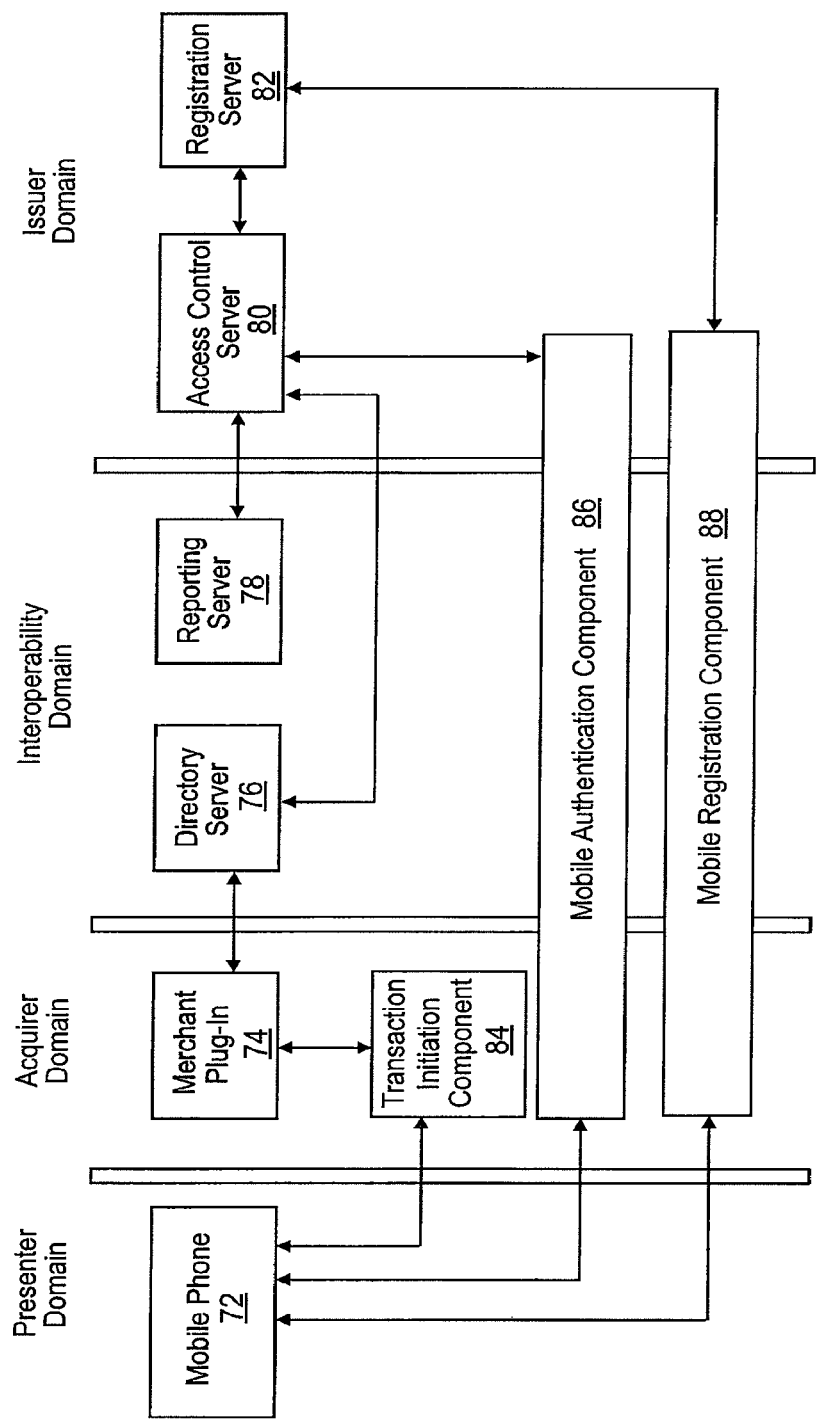
FIG. 3 shows another block diagram of another system according to another embodiment of the invention.

Another block diagram of a system according to another embodiment of the invention is shown in FIG. 3. The system includes a mobile phone 72 that is in a presenter domain. A merchant plug-in interface 74 is in an acquirer domain, and is in communication with a transaction initiation component 84 in the acquirer domain. A directory server 76 and a reporting server 78 are in an interoperability domain, and an access control server 80 and a registration server 82 are in an issuer domain. A mobile authentication component 86 and a mobile registration component 88 can work in the acquirer domain, the interoperability domain, and the issuer domain in this embodiment.

The mobile phone 72 can alternatively be any suitable communication device that can send and/or receive data (e.g., a fixed phone, PC on Internet, etc.). As noted above, a consumer (or presenter) can initiate transactions based on a mobile phone number, a mobile phone number plus a check digit(s), or some other suitable alias identifier. The alias identifier can be used as a substitute for a payment account number. The consumer may also use his mobile phone, or mobile number/alias in order to initiate a transaction, and/or to authenticate the transaction. The consumer may also use his mobile phone to register with the authentication program.

Upon the presenter's request, the transaction initiation component 84 can allow a merchant to initiate a payment process. The transaction initiation component 84 may be in the form of any suitable combination of hardware and software. In some cases, it may be present in hardware operated by a merchant (e.g., in or connected to a POS terminal). The transaction initiation component 84 can communicate with the merchant plug-in (MPI) 74 in the same way that a Web page communicates with a standard MPI in the Internet environment.

As in prior embodiments, the presenter's payment card number is advantageously not provided to the merchant when the transaction is initiated. The transaction is instead initiated on the basis of the presenter's phone number/alias, or other identifier, with a mobile transaction indicator.

The transaction initiation component 84 can facilitate a range of transaction initiation scenarios. The scenarios can be divided into those that allow the consumer's mobile number to be automatically passed to the merchant plug-in (MPI) 74, and those that allow the consumer's mobile number to be manually input. As noted above, the mobile phone number may be automatically passed to the merchant plug-in (MPI) 74 using IVR, USSD, SMS, or WAP. Alternatively, the phone number may be manually input into the system. For instance, it may be manually input into the authentication system by a call centre agent at a PC, a mobile merchant using his mobile phone as an acceptance device, etc. The transaction initiation component 84 can also provide a backwards communication channel to the merchant in order to inform the presenter of the status of the transaction.

The merchant plug-in (MPI) 74 can perform a number of functions. For example, it can facilitate transaction processing on the basis of a mobile number, without the use of a card number. It can also facilitate the inclusion of a mobile channel/device identifier in a verification message, thereby prompting the issuer to authenticate the transaction via a mobile channel. It can also provide backwards communication to the merchant in order to allow for the on-line enrollment of new presenters with their respective issuers.

The directory server (DS) 76 also provides a number of functions. It can map mobile numbers and/or other alias identifiers to BINs (bank identification numbers) and can allow authentication requests to be routed to the relevant issuers. The mobile numbers and/or alias identifiers and/or BIN numbers can be updated from the access control server (ACS) 80 (and vice-versa) if the consumer wishes to change his card, phone number or alias identifier. Also, in conjunction with the transaction initiation component 84 and the merchant plug-in (MPI) 74, the directory server (DS) 76 is able to facilitate the on-line enrollment of new presenters with relevant issuers.

The reporting server 78 provides reports. It can also record mobile numbers and/or alias identifiers.

The access control server (ACS) 80 can perform a number of functions. For example, upon receiving an identified transaction, it can initiate the sending of an authentication request message via the mobile authentication component 86 to the mobile phone 72. Upon receiving a positive authentication response message, the access control server (ACS) 80 can convert the presenter's mobile phone number into the presenter's registered PAN (primary account number).

The mobile authentication component 87 provides a bi-directional mobile channel between the presenter and the access control server (ACS) 80 for transaction authentication. The bi-directional channel may include may include IVR, WAP, or a client application that is loaded onto the presenter's mobile phone 72.

The registration server 82 provides a registration function and contains a mobile phone number and/or alias field for such data.

The mobile registration component 88 provides a bi-directional mobile channel between the presenter and the registration server 82. This channel is used to register the presenter in the authentication program, and is used to ensure that the presenter's registered mobile phone 72 is correct. Example mobile channels may include IVR, WAP, or a client application that is loaded onto the presenter's mobile phone. Note that the channel may be the same as, or based on, the mobile authentication component 86.

Figure 4:
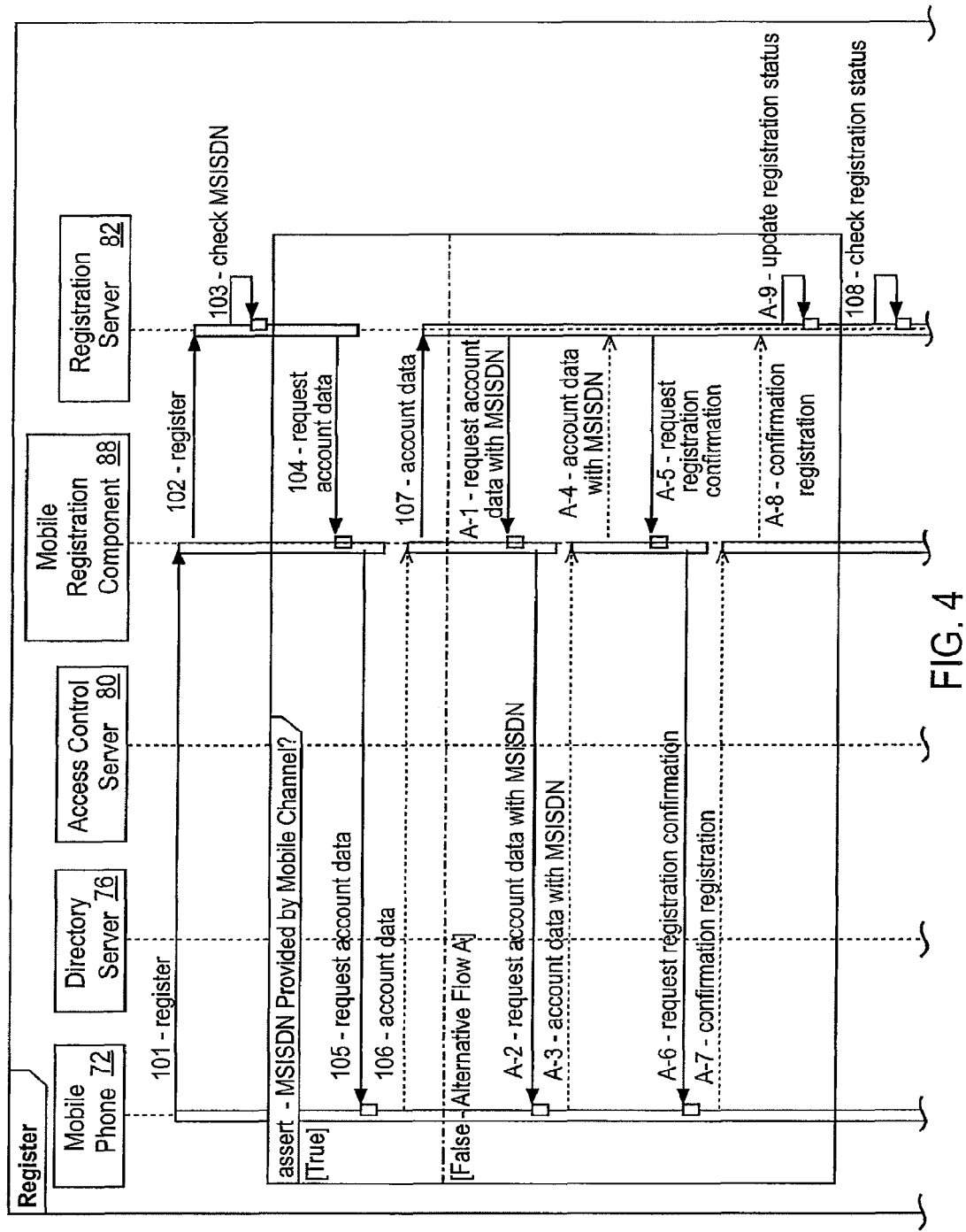
FIG. 4 shows a flow diagram illustrating a registration process embodiment that can occur before a payment transaction.
Figure 4:
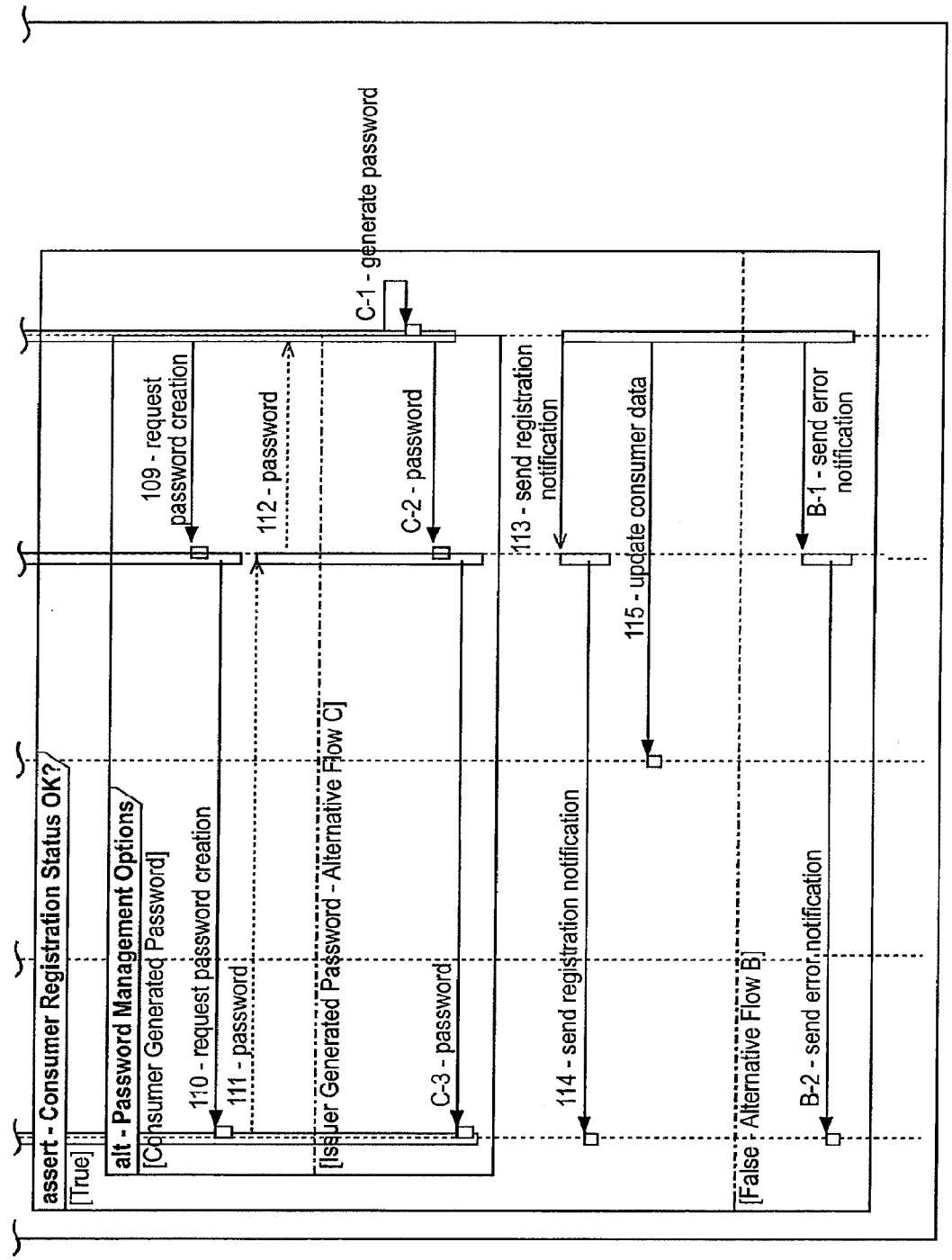

FIG. 4 shows a process flow where a presenter registers with the data authentication program prior initiating a payment transaction. In this example, a presenter can register a specific account over a mobile channel.

With reference to FIG. 4, a presenter registers an account associated with an issuer with the issuer's authentication program using his mobile phone 72. To do this, the mobile phone 72 may communicate with the issuer's mobile registration component 88 (step 101). The mobile registration component 88 translates and forwards the incoming registration request to the issuer's registration server 82 (step 102). The issuer registration server 82 checks to see if an MSISDN for the mobile phone 72 was passed through a mobile channel (step 103).

If the MSISDN for the mobile phone 72 is provided via a mobile channel, then the issuer's registration server 82 requests further account data from the presenter and sends account data request to the mobile registration component 88 (step 104). The mobile registration component 88 adapts the request based on the mobile channel and presenter's device capabilities and sends it to the presenter's mobile phone 72 (step 105). Using the mobile phone 72, the presenter then communicates back the account data to the mobile registration component 88 (step 106). The mobile registration component 88 then translates and forwards the account data to the issuer's registration server 82 (step 107).

As shown in Alternative Flow A, if the MSISDN is not provided by the mobile channel, the issuer's registration server 82 requests further account data including an MSISDN from the presenter by sending the request to the mobile registration component 88 (step A-1). The mobile registration component 88 then adapts the request based on the mobile channel and presenter's device capabilities and sends it to the presenter's mobile phone 72 (step A-2). Using the mobile phone 72, the presenter then sends back the account data and MSISDN to the mobile registration component 88 (step A-3). The mobile registration component 88 then translates and forwards the account data and MSISDN to the issuer's registration server 82 (step A-4). After this information is received, the issuer's registration server 82 sends a registration confirmation request to the mobile registration component 88 (step A-5). The mobile registration component 88 adapts the request based on a messaging mobile channel (e.g. SMS, USSD) and presenter's device capabilities and sends it to the presenter's mobile phone 72 (step A-6). The presenter receives the confirmation requests, accepts it and communicates it back to the mobile registration component 88 (step A-7). The mobile registration component 88 translates and forwards the confirmation response to the issuer's registration server 82 (step A-8). The issuer's registration server 82 then updates the pending presenter's registration status (step A-9).

At some point, the registration server 82 checks the validity of the registration status of the presenter (step 108).

If the presenter's registration is acceptable, then the issuer's registration server 82 can send a password creation request to the mobile registration component 88 (step 109). The mobile registration component 88 adapts the request based on the mobile channel and presenter's device capabilities and sends it to the presenter's mobile phone 72 (step 110). Using the mobile phone 72, the presenter provides a password and communicates it back to the mobile registration component 88 (step 111). The mobile registration component 88 translates and forwards the password to the issuer's registration server 82 (step 112). The issuer's registration server 82 then sends a registration notification to the mobile registration component 88 (step 113). The mobile registration component 88 adapts the notification based on the mobile channel and presenter's device capabilities and sends it to the presenter's mobile phone 72 (step 114). The issuer's registration server 82 then updates the access control server 80 with some of the presenter's account data (step 115).

In Alternative Flow B, the presenter's registration has failed. The issuer's registration server 82 sends a registration notification error to the mobile registration component 88 (step B-1). The mobile registration component 88 adapts the error message based on the mobile channel and presenter's device capabilities and sends it to the presenter's mobile phone 72 (step B-2).

Alternative Flow C relates to an issuer generated password. In this process flow, the issuer's registration server 82 generates a unique password (step C-1) (e.g., without input by the presenter). The issuer's registration server 82 sends the generated password to the mobile registration component 88 (step C-2). The mobile registration component 88 adapts the message based on the mobile channel and presenter's device capabilities and sends it to the presenter's mobile phone 72 (step C-3).

Figure 5:
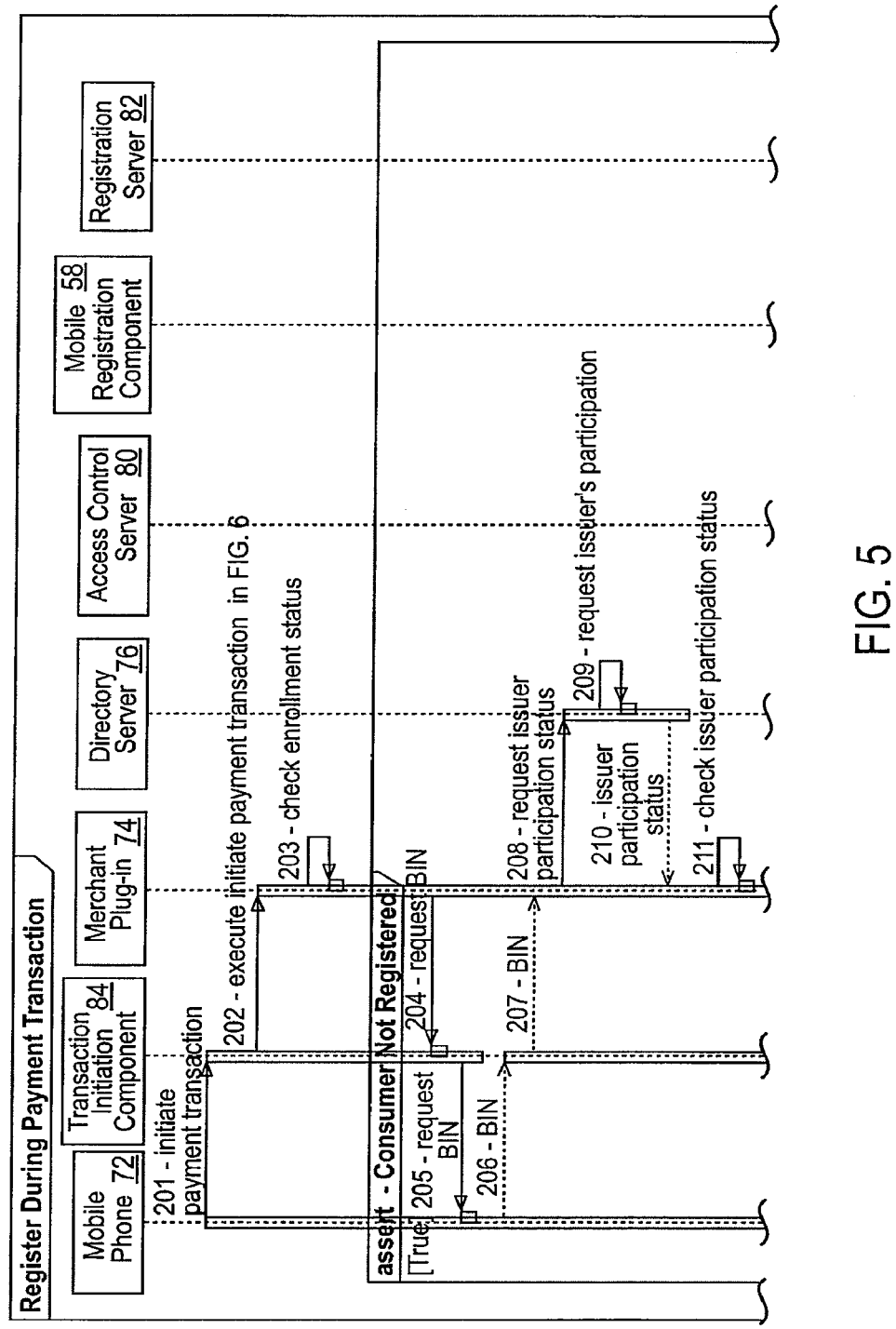
FIG. 5 shows a flow diagram illustrating a registration process embodiment that can occur during a payment transaction.
Figure 5:
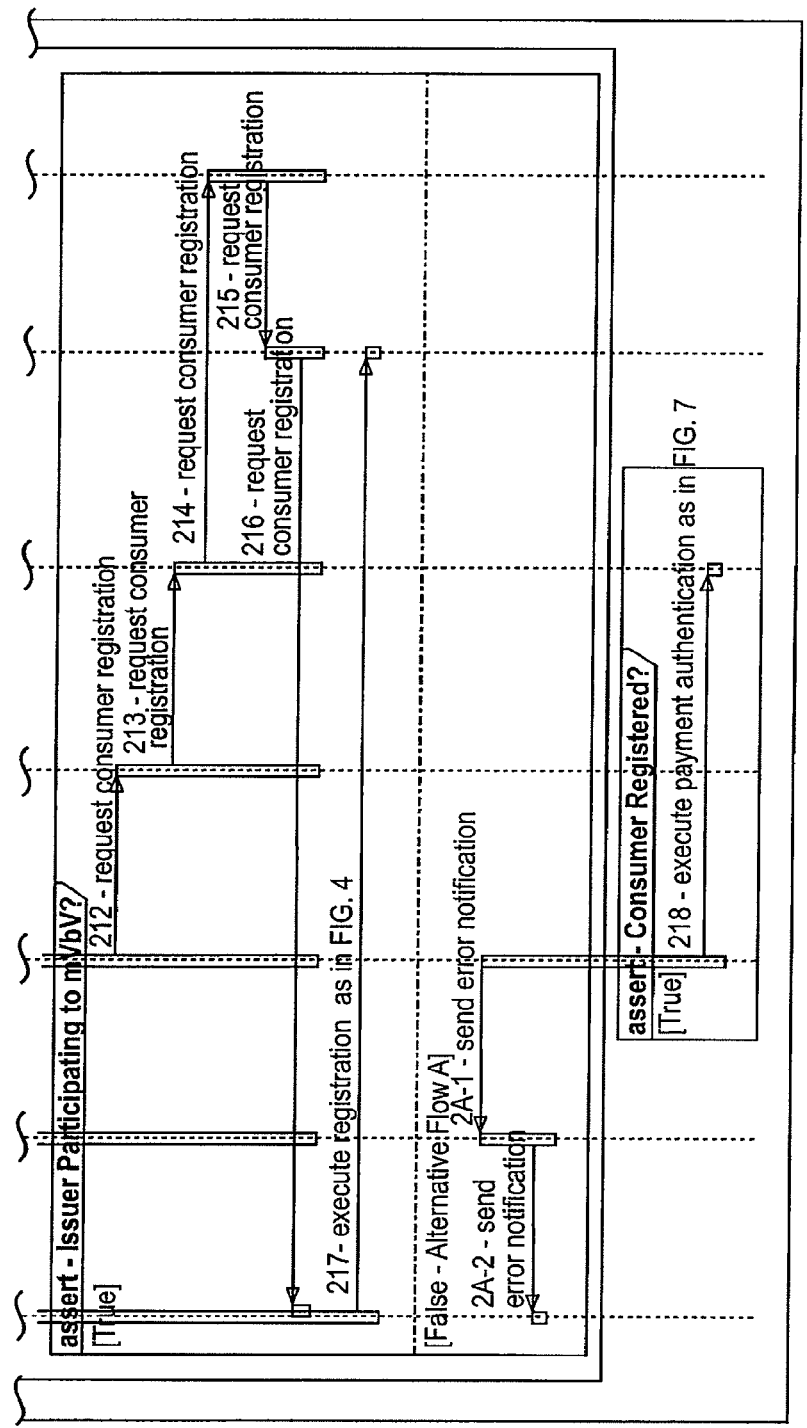
Figure 6:
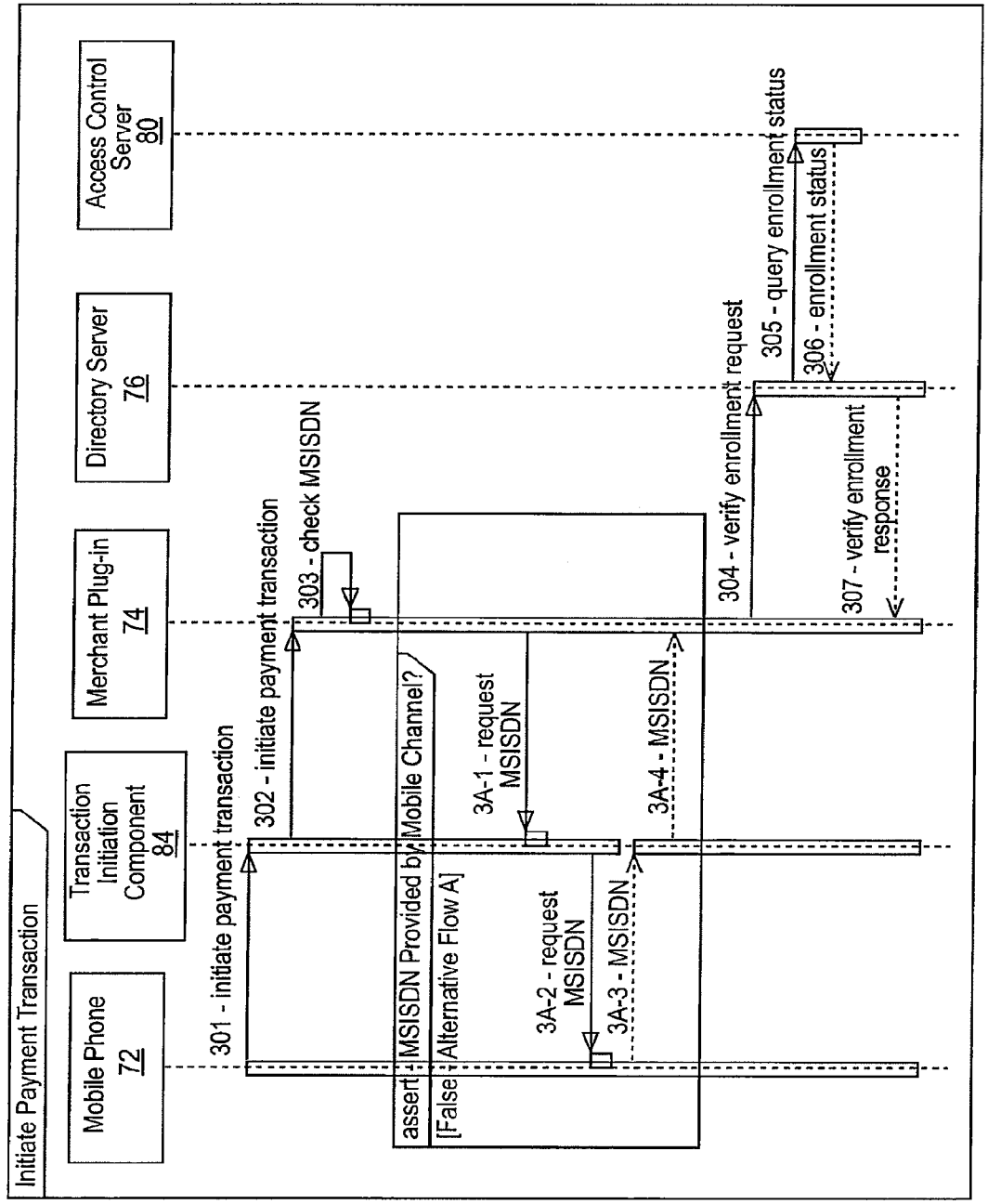
FIG. 6 shows a flow diagram illustrating a process embodiment for initiating a payment transaction.
Figure 7:
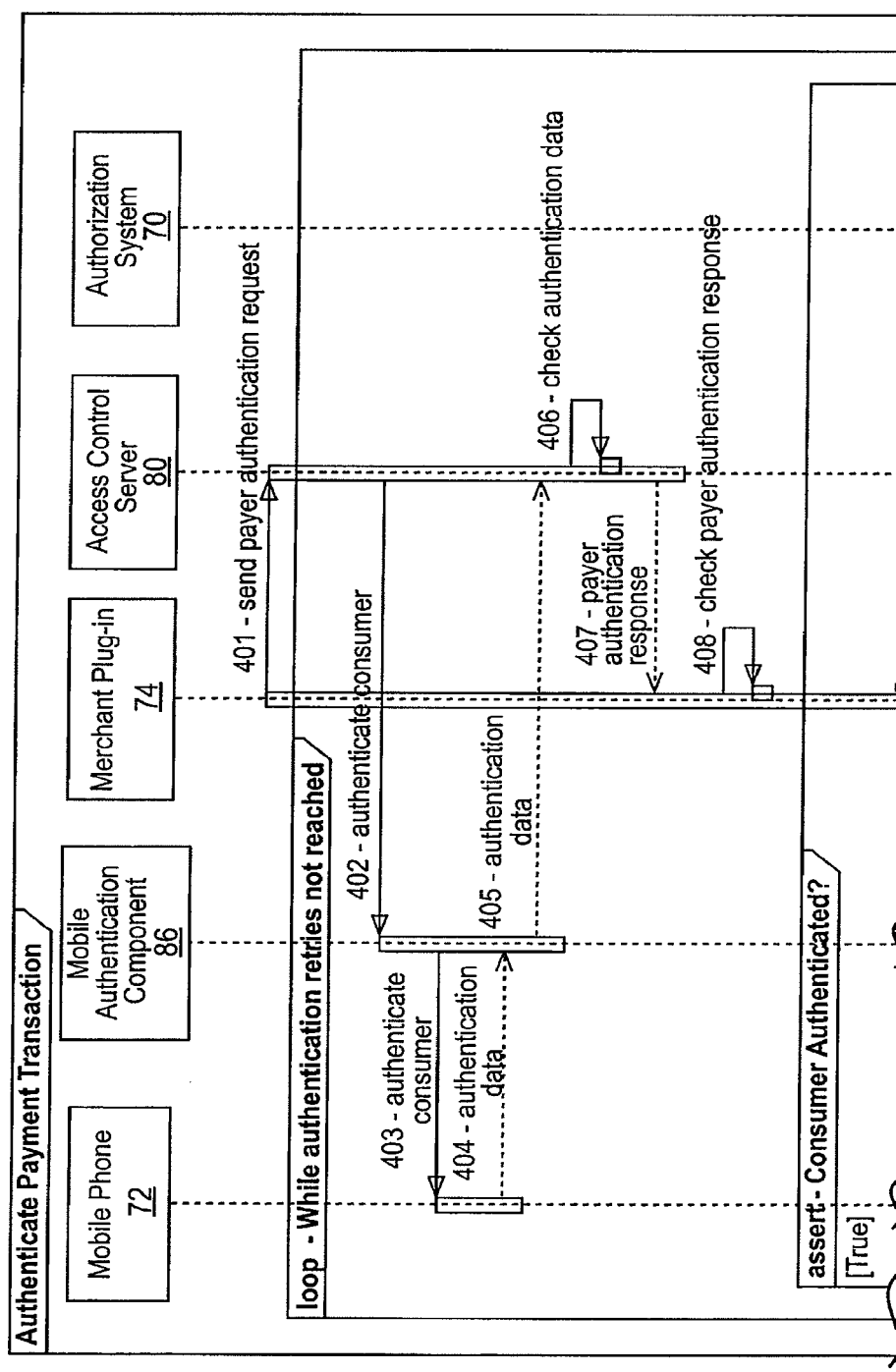
FIG. 7 shows a flow diagram illustrating an authentication process embodiment.
Figure 7:
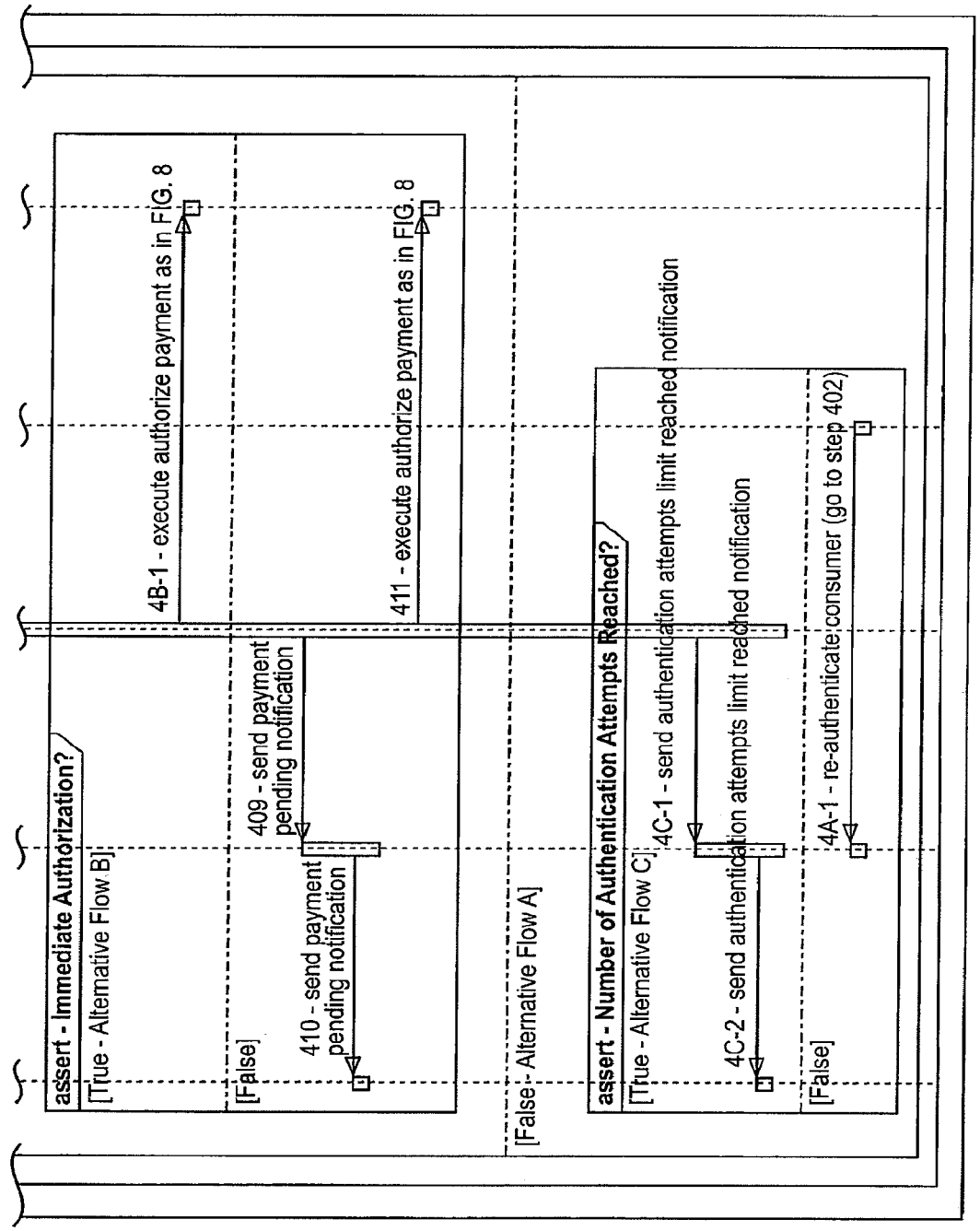

FIG. 5 shows a flow diagram for registration during a payment transaction over a mobile channel. With reference to FIG. 5, the presenter initiates a payment transaction via the transaction initiation component 84 (step 201). The transaction initiation component 84 translates and forwards the transaction details to the merchant plug-in (MPI) 74 (step 202). Then, the initiate payment transaction process, which is shown in FIG. 6 and is described in further detail below, is executed. The merchant plug-in (MPI) 74 checks the returned presenter's enrollment status. If the presenter is registered, then the flow continues at step 218 with an execution of the payment authentication process, which is shown in FIG. 7, and is described in further detail below.

If the presenter is not registered, the merchant plug-in (MPI) 74 sends a request for BIN (bank identification number) information to the transaction initiation component 84 (step 204). The transaction initiation component 84 adapts the request based on a mobile channel and presenter's device capabilities and sends it to the presenter's mobile phone 72 (step 205). Using the mobile phone 72, the presenter provides the requested BIN information and communicates it back to the transaction initiation component 84 (step 206). The transaction initiation component 84 translates and forwards the requested account data to the merchant plug-in (MPI) 74 (step 207). The merchant plug-in (MPI) 74 then requests the issuer's participation status by passing the collected account data to the directory server 76 (step 208). After receiving this information, the directory server 76 checks the issuer's registration status (step 209). The directory server 76 then sends back the issuer's registration status to the merchant plug-in (MPI) 74 (step 210). The merchant plug-in (MPI) 74 checks the issuer's registration status (step 211).

If the issuer participates in the authentication program, the merchant plug-in (MPI) 74 routes a presenter registration request to the directory server 76 (step 212). The BIN and telephone number are then passed to the issuer to properly register the presenter. The directory server 76 then routes the presenter registration request to the access control server (ACS) 80 (step 213). The access control server (ACS) 80 routes the presenter registration request to the issuer's registration server 82 (step 214). The issuer's registration server 82 then sends a presenter registration request to the mobile registration component 58 (step 215). The mobile registration component 88 adapts the request based on a mobile channel and presenter's device capabilities and sends it to the presenter's mobile phone 72 (step 216). The presenter registration process in FIG. 4 can then be executed (step 217). Upon successful presenter registration, the payment transaction is authenticated according to the process in FIG. 7, which is described in further detail below (step 218).

In the case where the issuer is not participating in the authentication program, the merchant plug-in (MPI) 74 sends an "issuer not registered" type of error message to the transaction initiation component 84. The transaction initiation component 84 adapts the request based on the mobile channel and presenter's device capabilities and sends it to the presenter's mobile phone 72 (step 2A-1). In this case, authentication is not performed and the payment transaction can be discarded.

FIG. 6 shows a flow diagram for a process where a presenter initiates a payment transaction. The process starts when a presenter decides to initiate a payment transaction with a merchant/acquirer over a mobile channel. It can end when the payment transaction is successfully initiated over a mobile channel (not yet authenticated). This process also has alternative paths where exceptions and errors can be taken in account.

With reference to FIG. 6, the presenter initiates a payment transaction using his/her mobile phone 72 via the transaction initiation component 84 (step 301). The transaction initiation component 84 translates and forwards the payment initiation request to the merchant plug-in (MPI) (step 302). The merchant plug-in (MPI) verifies that the MSISDN (mobile telephone number) was passed through the mobile channel (step 303). The merchant plug-in (MPI) 64 then sends a verify enrollment request (VE req) message to the directory server 76 (step 304). After receiving this message, the directory server 76 queries the access control server (ACS) 76 for presenter's enrollment status (step 305). The access control server (ACS) 76 returns the presenter enrollment status to the directory server (DS) 76 (step 306). The directory server 76 returns the verify enrollment response (VE res) message to the merchant plug-in (MPI) 74 (step 307). After receiving the enrollment response status, the presenter may start the registration process that is described in FIG. 5 (register during payment transaction).

If the MSISDN is not provided by the mobile channel, then the merchant plug-in (MPI) 74 requests the presenter's MSISDN through the transaction initiation component 84 (step 3A-1). The transaction initiation component 84 adapts the request based on the mobile channel and the presenter's device capabilities and sends it to the presenter's mobile phone 72 (step 3A-2). The presenter then sends back the MSISDN to the transaction initiation component 84 (step 3A-3). The transaction initiation component 84 translates and forwards the MSISDN to the merchant plug-in (MPI) 74 (step 3A-4).

FIG. 7 shows a process where a presenter has initiated a payment transaction that needs to be authenticated. The process starts when a presenter has initiated a payment transaction and is ready to be authenticated to finalize the transaction. After authentication, authorization can take place.

Referring to FIG. 7, the merchant plug-in (MPI) 74 sends a payer authentication request (PA req) message to the access control server 80 (step 401). The access control server 80 then sends an authentication request (there may be more than one account identifiers associated with the MSISDN) to the mobile authentication component 86 (step 402). After receiving this message, the mobile authentication component 86 adapts the request based on a mobile channel and presenter's device capabilities and sends it to the presenter's mobile phone 72 (step 403).

Using the mobile phone 72, the presenter provides the requested authentication data (e.g., a password) and sends back a response including the authentication data to the mobile authentication component 86 (step 404). The mobile authentication channel translates and forwards the response and passes it to the access control server (ACS) 80 for validation (step 405). The access control server (ACS) 80 then receives the authentication response, and checks the received authentication data (step 406). The access control server (ACS) 80 then sends back the payer authentication response (PA Res) message to the merchant plug-in (MPI) 74 (step 407). The merchant plug-in (MPI) 74 then checks the authentication response message (step 408).

If the consumer is authenticated, then a determination is made as to whether immediate authorization is appropriate. If immediate authorization is appropriate, then the process may proceed to the authorization process shown in FIG. 8, and described in further detail below (step 4B-1). If immediate authorization is not appropriate, the merchant plug-in (MPI)

74 then sends a payment pending notification message to the mobile authentication component 86 (step 409). The mobile authentication component 86 adapts the notification based on a mobile channel and the presenter's device capabilities and sends it to the presenter's mobile phone 410. Then, an authorize payment transaction process as shown in FIG. 8 (and as described in further detail below) is executed (step 411).

Alternative Flow A in FIG. 7 can occur when a presenter is not authenticated. Depending on the issuers' authentication rules, the access control server (ACS) 80 may re-issue the authentication request to the presenter via the mobile authentication component 86 or may notify the presenter that the number of authentication attempts is reached. If the number of authentication attempts have been reached, the merchant plug-in (MPI) sends an "authentication attempts limit reached" type of notification to the mobile authentication component 86 (step 4C-1). The mobile authentication component 86 adapts the notification based on a mobile channel and presenter's device capabilities and sends it to the presenter's mobile phone 72 (step 4C-2). If the number of authentication attempts have not been reached, then the process may proceed back to step 402, and may continue until the number of authentication attempts have been reached.

Figure 8:
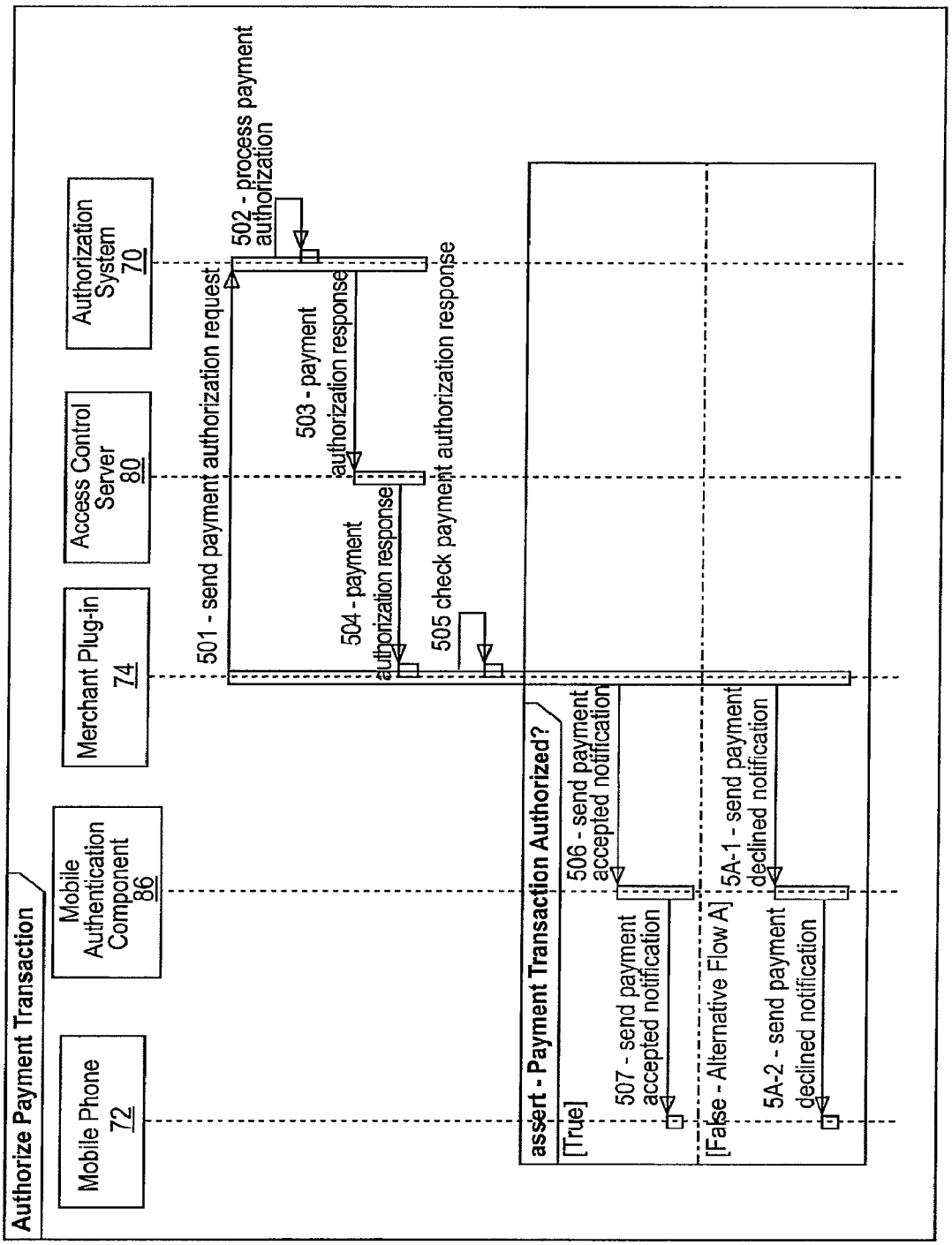
FIG. 8 shows a flow diagram illustrating a payment authorization process embodiment.

FIG. 8 can describe a process where an authenticated payment transaction needs to be authorized. Authorization can be immediate or differed. The process starts when a presenter has authenticated a payment transaction. The process ends when the payment authorization is successful.

Referring to FIG. 8, the merchant plug-in (MPI) sends a payment authorization request to an authorization system 70 (step 501). The authorization system 70 processes the payment authorization (step 502). The authorization system 70 then communicates the payment authorization response to the access control server (ACS) 80 (step 503). The access control server (ACS) 80 communicates the payment authorization response to the merchant plug-in (MPI) 74 (step 504). The merchant plug-in (MPI) 74 then checks the payment authorization response (step 505).

If the payment transaction is authorized, the merchant plug-in (MPI) 74 sends a payment accepted notification message to the mobile authentication component 86 (step 506). The mobile authentication component 86 adapts the notification based on a mobile channel and presenter's device capabilities, and sends it to the presenter's mobile phone 72 (step 507).

If a payment transaction is declined and not authorized, then the merchant plug in (MPI) 74 sends a payment declined notification message to the mobile authentication component (steps 5A-1 and 5A-2). The mobile authentication component adapts the notification based on a mobile channel and presenter's device capabilities and sends it to the presenter's mobile phone 72.

III. Portable Consumer Devices and Computer Apparatuses

Figure 9A:
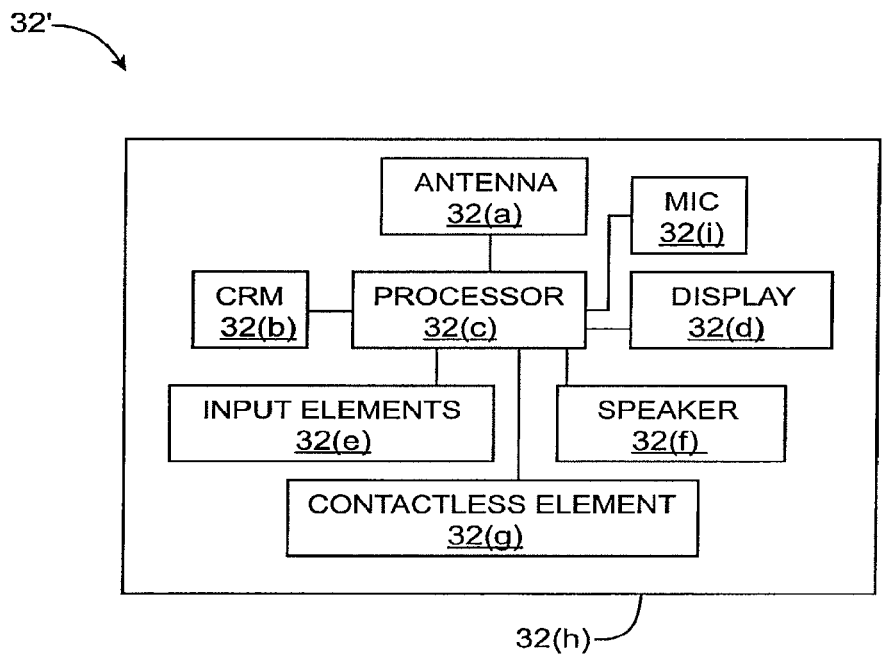
FIG. 9(a) shows a block diagram illustrating components in a phone.
Figure 9B:
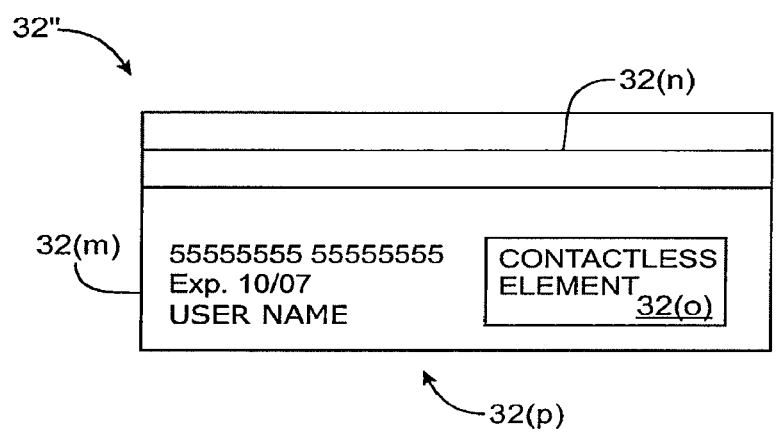
FIG. 9(b) shows components that may be in a typical payment card.
Figure 10:
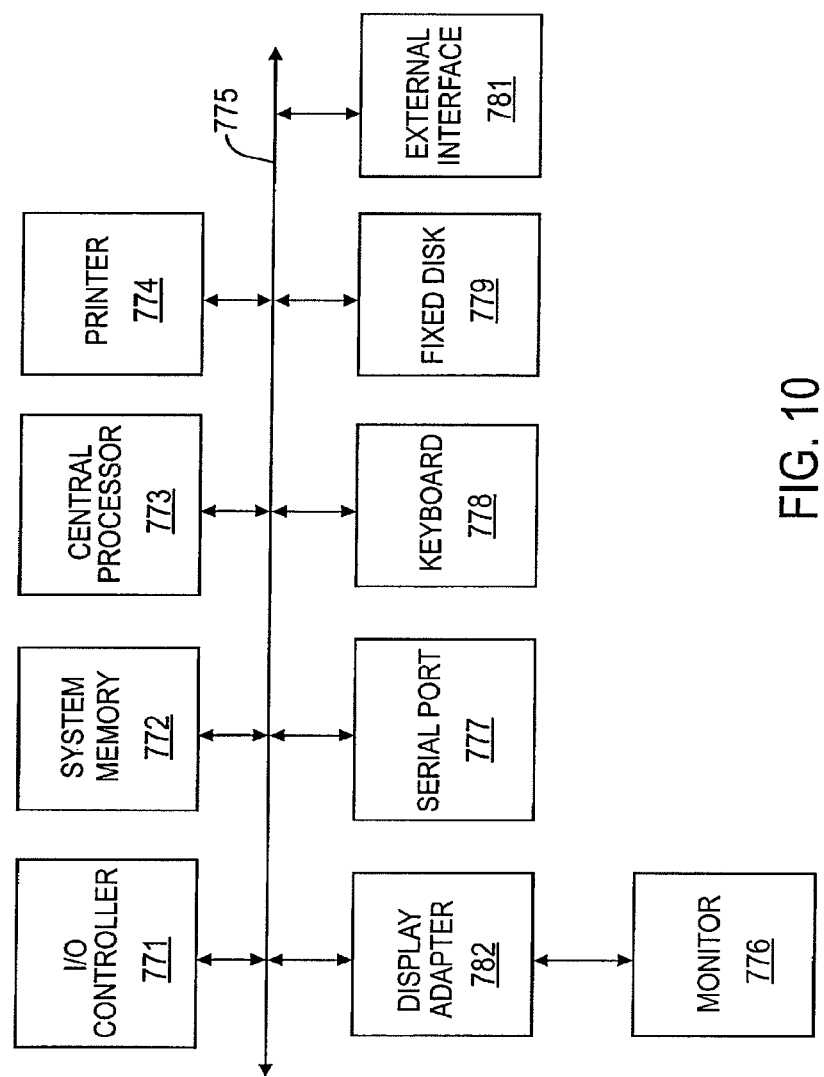
FIG. 10 shows a block diagram of components in a computer apparatus.

FIGS. 9-10 show block diagrams of portable computer devices and subsystems that may be present in computer apparatuses that are used in systems according to embodiments of the invention. In some embodiments described above, a presenter may have a payment card such as a credit card and a phone or other communication device, to receive authentication challenges. In other embodiments, the presenter may use a phone to conduct payment transactions and can use the phone to provide both payment data and to act as an interface for an authentication challenge. Cards and phones are examples of portable consumer devices and embodiments of the invention are not limited to these specific portable consumer devices.

Exemplary portable consumer devices may be in any suitable form. For example, suitable portable consumer devices can be hand-held and compact so that they can fit into a consumer's wallet and/or pocket (e.g., pocket-sized). They may include smart cards, ordinary credit or debit cards (with a magnetic strip and without a microprocessor), keychain devices (such as the Speedpass™ commercially available from Exxon-Mobil Corp.), etc. Other examples of portable consumer devices include cellular phones, personal digital assistants (PDAs), pagers, payment cards, security cards, access cards, smart media, transponders, and the like. The portable consumer devices can also be debit devices (e.g., a debit card), credit devices (e.g., a credit card), or stored value devices (e.g., a stored value card).

An exemplary portable consumer device in the form of a phone 32' may comprise a computer readable medium and a body as shown in FIG. 9(a). (FIG. 9(a) shows a number of components, and the portable consumer devices according to embodiments of the invention may comprise any suitable combination or subset of such components.) The computer readable medium 32(b) may be present within the body 32(h), or may be detachable from it. The body 32(h) may be in the form a plastic substrate, housing, or other structure. The computer readable medium 32(b) may be a memory that stores data and may be in any suitable form including a magnetic stripe, a memory chip, uniquely derived keys, encryption algorithms, etc. The memory also preferably stores information such as financial information, transit information (e.g., as in a subway or train pass), access information (e.g., as in access badges), etc. Financial information may include information such as bank account information, bank identification number (BIN), credit or debit card number information, account balance information, expiration date, consumer information such as name, date of birth, etc. Any of this information may be transmitted by the phone 32'.

Information in the memory may also be in the form of data tracks that are traditionally associated with credits cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks must abide by it. It contains the cardholder's account, encrypted PIN, plus other discretionary data.

The computer readable medium 32(b), or memory, may comprise code for performing any of the above-described steps in any suitable order. For example, the computer readable medium 32(b) may comprise a) code for providing an alias identifier associated with an account identifier associated with an account of a presenter; b) code for receiving an authentication request message after providing the alias identifier; and c) code for sending an authentication response message after receiving the authentication request message.

The phone 32' may further include a contactless element 32(g), which may include a semiconductor chip (or other data storage element) with an associated wireless transfer (e.g., data transmission) element, such as an antenna. Contactless element 32(g) is associated with (e.g., embedded within) phone 32' and data or control instructions transmitted via a cellular network may be applied to contactless element 32(g) by means of a contactless element interface (not shown). The contactless element interface functions to permit the exchange of data and/or control instructions between the mobile device circuitry (and hence the cellular network) and an optional contactless element 32(g).

Contactless element 32(g) is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the phone 32' and an interrogation device. Thus, the phone 32' is capable of communicating and transferring data and/or control instructions via both cellular network and near field communications capability.

The phone 32' may also include a processor 32(c) (e.g., a microprocessor) for processing the functions of the phone 32' and a display 32(d) to allow a consumer to see phone numbers and other information and messages. The phone 32' may further include input elements 32(e) to allow a consumer (or presenter) to input information into the device, a speaker 32(f) to allow the consumer to hear voice communication, music, etc., and a microphone 32(i) to allow the consumer to transmit her voice through the phone 32'. The phone 32' may also include an antenna 32(a) for wireless data transfer (e.g., data transmission).

As noted above, in some embodiments, the presenter or consumer may use a portable consumer device in the form of a debit, credit, or smartcard. The portable consumer device in the form of a card may also optionally have a feature such as a magnetic strip. Such devices can operate in either a contact or contactless mode.

An example of a portable consumer device in the form of a card 32" is shown in FIG. 9(a). FIG. 9(a) shows a plastic substrate 32(m). A contactless element 32(o) for interfacing with an access device such as a point of sale terminal may be present on or embedded within the plastic substrate 32(m). Consumer information 32(p) such as an account number, expiration date, and consumer name may be printed or embossed on the card. Also, a magnetic stripe 32(n) may also be on the plastic substrate 32(m).

As shown in FIG. 9(b), the card 32" may include both a magnetic stripe 32(n) and a contactless element 32(o). In other embodiments, both the magnetic stripe 32(n) and the contactless element 32(o) may be in the card 32". In other embodiments, either the magnetic stripe 32(n) or the contactless element 32(o) may be present in the card 32".

The various participants and elements in the previously described Figures (e.g., FIGS. 1-3) may operate using one or more computer apparatuses to facilitate the functions described herein. Any of the elements in the Figures may use any suitable number of subsystems to facilitate the functions described herein. Examples of such subsystems or components are shown in FIG. 10. The subsystems shown in FIG. 10 are interconnected via a system bus 775. Additional subsystems such as a printer 774, keyboard 778, fixed disk 779 (or other memory comprising computer readable media), monitor 776, which is coupled to display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus allows the central processor 773 to communicate with each subsystem and to control the execution of instructions from system memory 772 or the fixed disk 779, as well as the exchange of information between subsystems. The system memory 772 and/or the fixed disk 779 may embody a computer readable medium. Any of these elements may be present in the previously described features. For example, the previously described directory server and access control server may have one or more of these components shown in FIG. 10.

A computer readable medium according to an embodiment of the invention may comprise code for performing any of the functions described above. For example, the previously described directory server may comprise a computer readable medium comprising: a) code for providing an alias identifier associated with an account identifier associated with an account of a presenter; b) code for receiving an authentication request message after providing the alias identifier; and c) code for sending an authentication response message after receiving the authentication request message. The directory server may also have a processor coupled to the computer readable medium, where the processor executes instructions embodied by computer code on the computer readable medium.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed. Moreover, any one or more features of any embodiment of the invention may be combined with any one or more other features of any other embodiment of the invention, without departing from the scope of the invention.

Also, it should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
    a) providing, to a mobile device of a presenter by a server computer, an authentication request, wherein the authentication request is provided in response to a receipt of an alias identifier and a determination of (i) an account number associated with the alias identifier and (ii) an issuer that issued the account number, the issuer operating an issuer computer;
    b) receiving, by the server computer, an authentication response comprising a PIN or password of the presenter;
    c) transmitting, by the server computer, a request comprising transaction data comprising an account number and the PIN or password to the issuer computer; and
    d) receiving, by the server computer, a response from the issuer computer validating the account number, and PIN or password of the presenter.

2. The method as recited in claim 1 further comprising: receiving the alias identifier from the mobile device; and determining the account number associated with the alias identifier.

3. The method of claim 1 wherein the mobile device is a mobile phone.

4. The method of claim 1 wherein the alias identifier was selected from among a plurality of alias identifiers.

5. The method of claim 1 wherein the alias identifier is a phone number associated with the mobile device.

6. The method of claim 1 wherein receiving, by the server computer, the authentication response comprising a PIN or password comprises receiving, by the server computer, the authentication response comprising the PIN.

7. The method of claim 1 wherein the authentication response is encrypted.

8. The method of claim 1 wherein the transaction data are encrypted.

9. A server computer comprising a processor and a computer readable medium, the computer readable medium comprising code, executable by the processor to implement a method comprising:
   a) providing, to a mobile device of a presenter by the server computer, an authentication request, wherein the authentication request is provided in response to a receipt of an alias identifier and a determination of (i) an account number associated with the alias identifier and (ii) an issuer that issued the account number, the issuer operating an issuer computer;
   b) receiving, by the server computer, an authentication response comprising a PIN or password of the presenter;
   c) transmitting, by the server computer, a request comprising transaction data comprising an account number and the PIN or password to the issuer computer; and
   d) receiving, by the server computer, a response from the issuer computer validating the account number, and PIN or password of the presenter.

10. The server computer of claim 9 wherein the method further comprises:
    receiving the alias identifier from the mobile device; and
    determining, the account number associated with the alias identifier.

11. The server computer of claim 9 wherein the mobile device is a mobile phone.

12. The server computer of claim 9 wherein the alias identifier was selected from among a plurality of alias identifiers.

13. The server computer of claim 9 wherein the alias identifier is a phone number associated with the mobile device.

14. The server computer of claim 9 wherein receiving, by the server computer, the authentication response comprising a PIN or password comprises receiving, by the server computer, the authentication response comprising the PIN.

15. The server computer of claim 9 wherein the authentication response is encrypted.

16. The server computer of claim 9 wherein the transaction data are encrypted.

* * * * *